US012744560B1

(12) United States Patent
Rofougaran et al.

(10) Patent No.: US 12,744,560 B1
(45) Date of Patent: Sep. 22, 2026

(54) DETECTION AND PROCESSING OF SPREAD SPECTRUM SIGNALS

(71) Applicant: PELTBEAM INC., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Arman Rofougaran, Newport Beach, CA (US); Milan Rofougaran, Newport Coast, CA (US); Kavian Odabaee, Newport Coast, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

(21) Appl. No.: 19/562,880

(22) Filed: Mar. 11, 2026

(51) Int. Cl.
*H04B 1/69* (2011.01)
*H04B 1/06* (2006.01)

(52) U.S. Cl.
CPC .................................... *H04B 1/69* (2013.01); *H04B 1/06* (2013.01)

(58) Field of Classification Search
CPC .................................... H04B 1/69; H04B 1/06
USPC .......................................................... 375/130
See application file for complete search history.

(56) References Cited

U.S. PATENT DOCUMENTS 9,524,628 B1 * 12/2016 Omer .................. G08B 13/187
2003/0198286 A1 * 10/2003 Belotserkovsky ... H04B 1/7097 375/150

* cited by examiner

*Primary Examiner* — Leila Malek
(74) *Attorney, Agent, or Firm* — CHIP LAW GROUP

(57) ABSTRACT

A wireless communication device includes a processor that determines a signal type is one of a spread spectrum signal or a non-spread spectrum signal. The determination is based on a signal-type analysis on digitized down-converted signals. The digitized down-converted signals are input signals in a plurality of different intermediate frequency bands. The processor executes a multi-dimensional signal state processing operation to generate a plurality of signal state representations for each intermediate frequency band of a plurality of different intermediate frequency bands when the determined signal type is the spread spectrum signal. The processor determines one or more correlated signal patterns across the generated plurality of signal state representations when the determined signal type is the spread spectrum signal. The processor controls the wireless communication device to trigger an operational response based on the determined one or more correlated signal patterns.

20 Claims, 6 Drawing Sheets

DETECTION AND PROCESSING OF SPREAD SPECTRUM SIGNALS

CROSS-REFERENCE TO RELATED APPLICATIONS/INCORPORATION BY REFERENCE

None.

FIELD OF TECHNOLOGY

Certain embodiments of the disclosure relate to wireless communication devices and spectrum monitoring systems. More specifically, certain embodiments of the disclosure relate to a wireless communication device and a method for enhanced detection and processing of spread spectrum signals.

BACKGROUND

The rapid growth of wireless communication technologies and the increasing demand for high-bandwidth applications have led to significant challenges in the current spectrum management landscape. It is known that radio monitoring is the basis of spectrum management. Spectrum monitoring helps spectrum regulators to plan and use frequencies, avoid incompatible usage, and identify sources of harmful interference. It is a growing problem due to the growing number of RF spectrum uses. Equipment such as spectrum analyzers are useful tools for analyzing and monitoring radio frequency (RF) signals. These instruments are useful for wireless communications testing, ensuring regulatory compliance, and troubleshooting RF interference. Spectrum analyzers play vital roles in RF design, testing, and electronic circuit development. Conventional spectrum analyzers, while effective to a certain extent, face several limitations. Currently, there are many technical challenges in effective spectrum monitoring and signal analysis across multiple frequency bands in increasingly congested electromagnetic environments. Further, there is a significant cost barrier that prevents widespread deployment of spectrum monitoring systems, particularly in applications requiring multiple monitoring points. For example, high-end analyzers capable of monitoring frequencies up to 80+ GHz can cost between $1-2 million per unit, with even lower frequency models (4-5 GHz) ranging from $15,000-50,000.

Current spectrum analysis solutions fall into two categories: swept analyzers and real-time analyzers. Swept analyzers operate by sequentially scanning frequency ranges, introducing deadtime between sweeps that can miss intermittent signals. Real-time analyzers offer faster acquisition to some extent but require complex and expensive hardware for Fast Fourier Transform (FFT) processing. Both approaches typically demand dedicated hardware for different frequency bands, further increasing system complexity and cost. These limitations become particularly problematic in modern wireless environments characterized by, for example: (a) increasing spectrum congestion from proliferating wireless devices; (b) growing deployment of autonomous systems requiring reliable communication; (c) need for reliable interference detection and mitigation; (d) requirements for spatial awareness and signal source location; and (e) complex signal environments requiring advanced pattern recognition. With conventional systems, while traditional software-defined radio (SDR) solutions offer more flexibility, they often have restricted frequency spans and insufficient processing capability for advanced signal analysis. Additionally, conventional analyzers struggle with limited spatial awareness, making it difficult to locate and characterize signal sources in complex environments. Furthermore, in an example, there is a form factor constraint with traditional systems used for spectrum monitoring. Traditional benchtop units require significant space, whereas portable units sacrifice functionality for mobility. Furthermore, current systems typically process each frequency band in isolation, creating detection gaps for sophisticated signals like frequency-hopping transmitters or coordinated multi-band jammers.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A wireless communication device and a method for enhanced detection and processing of spread spectrum signals, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
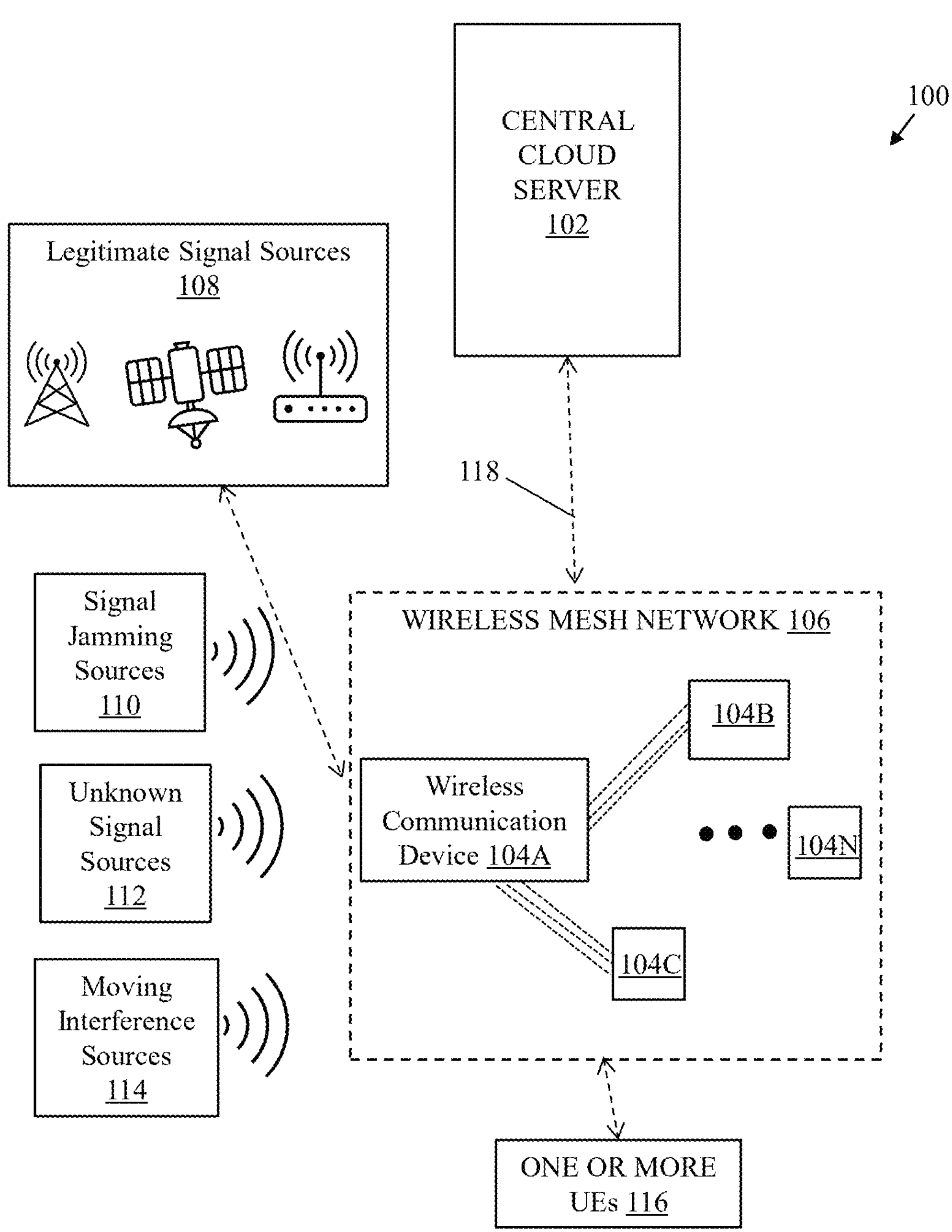
FIG. 1 is a diagram that illustrates an exemplary system for enhanced detection and processing of spread spectrum signals, in accordance with an exemplary embodiment of the disclosure.

Certain embodiments of the disclosure may be found in a wireless communication device and a method for enhanced detection and processing of spread spectrum signals.

Conventional wireless spectrum monitoring systems face significant limitations when detecting and analyzing sophisticated spread spectrum signals across multiple frequency bands. Current systems typically apply uniform processing approaches to all signal types, creating computational inefficiencies and detection gaps for complex signals like frequency-hopping spread spectrum (FHSS) or direct sequence spread spectrum (DSSS) transmissions. The inability to differentiate between spread spectrum and conventional signals (e.g., non-spread spectrum signals) results in either over-processing of simple signals or under-processing of complex signals, leading to missed detections of sophisticated threats. Additionally, existing systems analyze signals in single domains (typically frequency domain), preventing detection of spread spectrum characteristics that span multiple signal representations. Most conventional approaches lack cross-state correlation capabilities, which limits ability to identify coordinated patterns across different signal characteristics like timing, frequency, phase, and amplitude relationships that are useful for detecting advanced spread spectrum communications and jamming techniques.

In contrast to conventional systems and devices, the disclosed wireless communication device and method achieve enhanced spread spectrum signal detection through intelligent integration of signal-type classification and selective multi-dimensional signal state processing. For example, by determining signal type classification between spread spectrum and non-spread spectrum signals, the wireless communication device may achieve computational efficiency by applying multi-dimensional signal state processing (e.g., quantum-inspired processing) only to complex signals while using standard correlation operations for non-spread spectrum signals, reducing overall processing overhead by 60-70% compared to conventional uniform processing approaches. The multi-dimensional signal state processing operation may generate multiple concurrent signal representations (time, frequency, phase, amplitude, wavelet domains) that provide comprehensive signal characterization capabilities as compared to single-domain analysis methods. The multi-state correlation operation may detect sophisticated spread spectrum patterns through cross-state relationship analysis, enabling detection of frequency hopping sequences, direct sequence patterns, and hybrid modulation schemes that would remain hidden in conventional single-domain approaches, significantly improving detection accuracy by 25-40% for complex signals in contested RF environments. Further, the determination of correlated signal patterns across multiple signal state representations may create a synergistic effect where coordinated signal behaviors across different signal characteristics reveal sophisticated transmission schemes that exceed detection capabilities of individual state analysis. The correlated pattern analysis may improve identification of frequency hopping jammers, advanced persistent threats, and coordinated multi-band interference sources, enabling security capabilities beyond conventional spectrum analyzers. Furthermore, the operational response triggering based on detected patterns may enable the wireless communication device to immediately adapt system parameters, adjust beamforming patterns, or coordinate with different network nodes based on threat identification. The real-time adaptive response capability may reduce reaction times from seconds to milliseconds, which may be useful for countering fast-moving threats, improving dynamic spectrum access, and maintaining network resilience against sophisticated interference in next-generation wireless environments including Wi-Fi® 7 and spectrum interference scenarios.

Furthermore, conventional systems and devices (e.g. conventional spectrum analyzers) manifest hardware complexity, such as multiple dedicated radio frequency (RF) front ends for different frequency bands, expensive analog-to-digital converters (ADCs) for high-bandwidth signal capture (e.g., >7 GHZ), and complex signal processing hardware driving high spectrum analyzer costs. In contrast to conventional systems and devices (e.g. conventional spectrum analyzers) requiring dedicated hardware for different frequency bands, embodiments herein advantageously utilize WLAN chipsets (e.g., IEEE 802.11be chipset and modems) with intelligent signal down conversion and signal processing architectures to achieve wide frequency range coverage (DC to 300 GHz).

FIG. 1 is a diagram that illustrates an exemplary system for enhanced detection and processing of spread spectrum signals, in accordance with an exemplary embodiment of the disclosure. With reference to FIG. 1, there is shown a system 100 for enhanced spectrum sensing across multiple frequency bands. The system 100 may include a central cloud server 102, a plurality of wireless communication devices, such as wireless communication devices 104A, 104B, 104C, . . . , 104N. In an implementation, the wireless communication devices 104A, 104B, 104C, . . . , 104N may be interconnected in a wireless mesh network 106. In some implementations, each of the wireless communication devices 104A, 104B, 104C, . . . , 104N may function independently as a standalone device for enhanced spectrum sensing across multiple frequency bands or may work in cooperation for not only enhanced spectrum sensing across multiple frequency bands but also wireless data communication and routing across the wireless mesh network 106.

There are further shown different types of signal sources, such as legitimate signal sources 108, signal jamming sources 110, unknown signal sources 112, and moving interference sources 114. The legitimate signal sources 108, for example, may be authorized and licensed wireless carrier network frequencies, for example, 4G or 5G signals from base stations or small cells, frequencies used for direct-to-cell service (e.g., satellite-to-cell phone service), or authorized wireless local area network (WLAN) signals (e.g., Wi-Fi® signals), or various legitimate commercial or non-commercial RF signals, as per use case. The wireless communication devices 104A, 104B, 104C, . . . , 104N may not be initially aware of the different types of signal sources and may perform RF signal scanning (e.g., airwaves scanning) to detect and identify active signal sources and potential receivers operating on specific frequencies within range. In an implementation, the wireless communication devices 104A, 104B, 104C, . . . , 104N may be further communicatively coupled to the central cloud server 102, via a communication network 118.

The central cloud server 102 includes suitable logic, circuitry, and interfaces that may be configured to communicate with the wireless communication devices 104A, 104B, 104C, . . . , 104N (may also be referred to as network nodes or a mesh nodes). In an implementation, the central cloud server 102 may be communicatively coupled to each network node including one or more user equipment (UEs) 116. In an example, the central cloud server 102 may be a remote management server that is managed by a third party different from the service providers associated with the plurality of different wireless carrier networks (WCNs), service providers or spectrum owners. In an example, the central cloud server 102 may be a remote management server or a data center that is managed by a third party, or jointly managed, or managed in coordination and association with one or more of the plurality of different WCNs or different service providers.

The wireless communication devices 104A, 104B, 104C, . . . , 104N may also be referred to as mesh nodes when connected to each other in the wireless mesh network 106. Each of the wireless communication devices 104A, 104B, 104C, . . . , 104N, may be configured to capture and monitor raw RF signals from direct current (DC, i.e. 0 hertz (Hz)) to 300 Gigahertz (GHz) and analyze the captured RF signals. Each of the wireless communication devices 104A, 104B, 104C, . . . 104N may be a multi-functional device for spectrum-sensing across a plurality of frequency bands (DC to 300 GHz) and for wireless data communication to one or more wireless communication devices in the wireless mesh network 106. Examples of the wireless communication devices 104A, 104B, 104C, . . . , 104N, may include but is not limited to a wide-range spectrum monitoring device or a special dual-purpose device for spectrum sensing and wireless data communication, a modified repeater device, or a 5G backplane system.

The wireless mesh network 106 may be a resilient, high-capacity wireless network that extends the reach of a fiber backbone to provide widespread coverage to end users, such as the one or more UEs 116 via the wireless communication devices 104A, 104B, 104C, . . . , 104N. The fiber backbone (not shown) may be a high-performance, fiber-optic core network infrastructure that connects central offices, data centers, and the wireless mesh network 106. The fiber backbone may aggregate traffic from the central offices and data centers and provide seamless integration between the fiber and wireless network components.

The legitimate signal sources 108 may refer to authorized transmitters operating within licensed frequency bands in compliance with regulatory standards and predetermined protocols. Examples of the legitimate signal sources may include, but not limited to, cellular base stations, small cells, or repeaters, licensed FM/AM radio stations, commercial broadcast transmitters, public safety communications, satellite downlinks, authorized military communications within designated bands, authorized Wi-Fi® signals, GPS satellites operating at 1575.42 MHz, and licensed point-to-point microwave links, financial trading networks using 70/80 GHz E-band, Broadcast studio-to-transmitter links (STL), for example, at 950 MHz, utility supervisory control and data acquisition (SCADA) networks operating at 4/6 GHz, enterprise building-to-building connections at 60 GHz, public safety backhaul networks at 4.9 GHZ, or Internet service provider backbone links). The licensed point-to-point microwave links may include, for example, cellular backhaul links operating at Jun. 11, 2018/23 GHz or other bands.

The signal jamming sources 110 may refer to devices deliberately emitting interference signals designed to disrupt or degrade wireless communications across single or multiple frequency bands. Examples of the signal jamming sources may include, but not limited to, GPS jammers, cellular blockers (e.g., multi-band jammers (GSM/CDMA/3G/4G/5G), Frequency hopping cell disruptors, Band-specific blockers (700 MHz/850 MHz/1900 MHz), Smart jammers targeting control channels, or Base station signal overriders), broadband noise generators, targeted frequency disruptors, and pulsed interference systems.

The unknown signal sources 112 may refer to transmitters producing RF emissions that do not conform to known signal characteristics, protocols, or authorized frequency allocations. Examples of the unknown signal sources may include, but not limited to, unidentified transmitters, non-standard modulation signals, encrypted transmissions of unknown origin, sporadic unauthorized emissions, and signals using uncharacterized protocols.

The moving interference sources 114 may refer to mobile entities generating RF interference that change spatial location over time, whether intentional or unintentional. Examples of the moving interference sources may include, but not limited to, vehicles with malfunctioning electronics, mobile jamming platforms, interference-generating drones, vessels with non-compliant radio systems, and portable unauthorized transmitters in motion.

The one or more UEs 116 may correspond to a wireless communication device, such as a client device or telecommunication hardware used by an end user to communicate. Some of the one or more UEs 116 may refer to a combination of a mobile equipment and subscriber identity module (SIM). Examples of the one or more UEs 116 may include, but are not limited to a smartphone, a laptop, a desktop machine, a customer premise equipment, a virtual reality headset, an augmented reality device, a wireless modem, a home router, a Wi-Fi® enabled smart television (TV) or set-top box, a VoIP station, or any other customized hardware for wireless communication.

The communication network 118 may refer to the infrastructure and protocols enabling secure data exchange between the wireless communication devices 104A, 104B, 104C, . . . , 104N and the central cloud server 102 through one or more known wireless transmission mediums. Examples of the one or more known wireless transmission mediums may include, but are not limited to, a wireless carrier network, a wide area network (WAN), the Internet, a wireless local area network (WLAN), a wireless personal area network (WPAN), a cellular network, an ad-hoc wireless mesh network, a satellite communication network, a microwave communication link, or a combination thereof.

The various operations of the disclosed system 100 may be explained by taking an example of one wireless communication device, such as the wireless communication devices 104A. It is to be understood that operations described for the wireless communication device 104A may be applicable to other wireless communication devices 104B, 104C, . . . , 104N. For example, each of the wireless communication devices 104A, 104B, 104C, . . . , 104N may be configured to perform wideband spectrum monitoring with high sensitivity and dynamic range while intelligently utilizing the processing capabilities of a commercial WLAN chipset (e.g., IEEE 802.11be chipset and modems) modified for signal monitoring with intelligent signal down conversion and signal processing architectures to achieve wide frequency range coverage (DC to 300 GHz) in a cost-effective manner.

Typically, IEEE 802.11be/ax (Wi-Fi® 7/6E) hardware is conventionally designed for high-throughput wireless networking, operating in 2.4 GHz, 5 GHZ, and 6 GHz bands. The IEEE 802.11be/ax (Wi-Fi® 7/6E) hardware provides features, such as multi-link operation (MLO), 320 MHz channels, 4K Quadrature Amplitude Modulation (QAM) modulation, and multi-user multiple-input multiple-output (MIMO) primarily for data communication between access points and client devices.

The present disclosure modifies and repurposes IEEE 802.11be/ax hardware beyond its standard networking role by integrating wideband spectrum monitoring capabilities. Typically, IEEE 802.11be/ax hardware can only process frequencies ranging from 1-7 GHz and such IEEE 802.11be/ax hardware are not meant for spectrum monitoring. In an example, the wireless communication device 104A may leverage the hardware's advanced signal processing capabilities while extending frequency coverage from DC to 300 GHz through multi-stage conversion. Such adaptation enables concurrent operation as a wireless networking device and a spectrum monitoring platform, utilizing features, such as MLO and high-speed signal processing for signal detection, classification, and analysis across a significantly broader range than traditional Wi-Fi® operations. The wireless communication device 104A maintains networking functionality in the system 100 while adding capabilities for detecting different types of signal sources, such as the legitimate signal sources 108, the signal jamming sources 110, the unknown signal sources 112, and the moving interference sources 114.

In an implementation, multiple monitoring nodes, such as the wireless communication devices 104A, 104B, 104C, . . . , 104N, may operate concurrently across different frequency bands. In such a case, each node may perform local analysis, and the data is then sent to a central fusion center, such as the central cloud server 102, for real-time processing and combining. The distributed operation may further allow for enhanced spatial coverage, improved jammer resistance through diversity, and scalable deployment while maintaining high-resolution analysis capabilities.

Beneficially, each of the wireless communication devices 104A, 104B, 104C, . . . 104N intelligently modifies and repurposes IEEE 802.11be/ax hardware beyond its standard networking role through intelligent integration of signal-type classification and multi-dimensional signal state processing. For example, by determining signal type classification between spread spectrum and non-spread spectrum signals, the wireless communication device achieves computational efficiency by applying multi-dimensional signal state processing (e.g., quantum-inspired processing) only to complex signals while using standard correlation operations for non-spread spectrum signals, reducing overall processing overhead by 60-70% compared to conventional uniform processing approaches. The multi-dimensional signal state processing operation may generate multiple concurrent signal representations (time, frequency, phase, amplitude, wavelet domains) that provide comprehensive signal characterization capabilities as compared to single-domain analysis methods.

Figure 2:
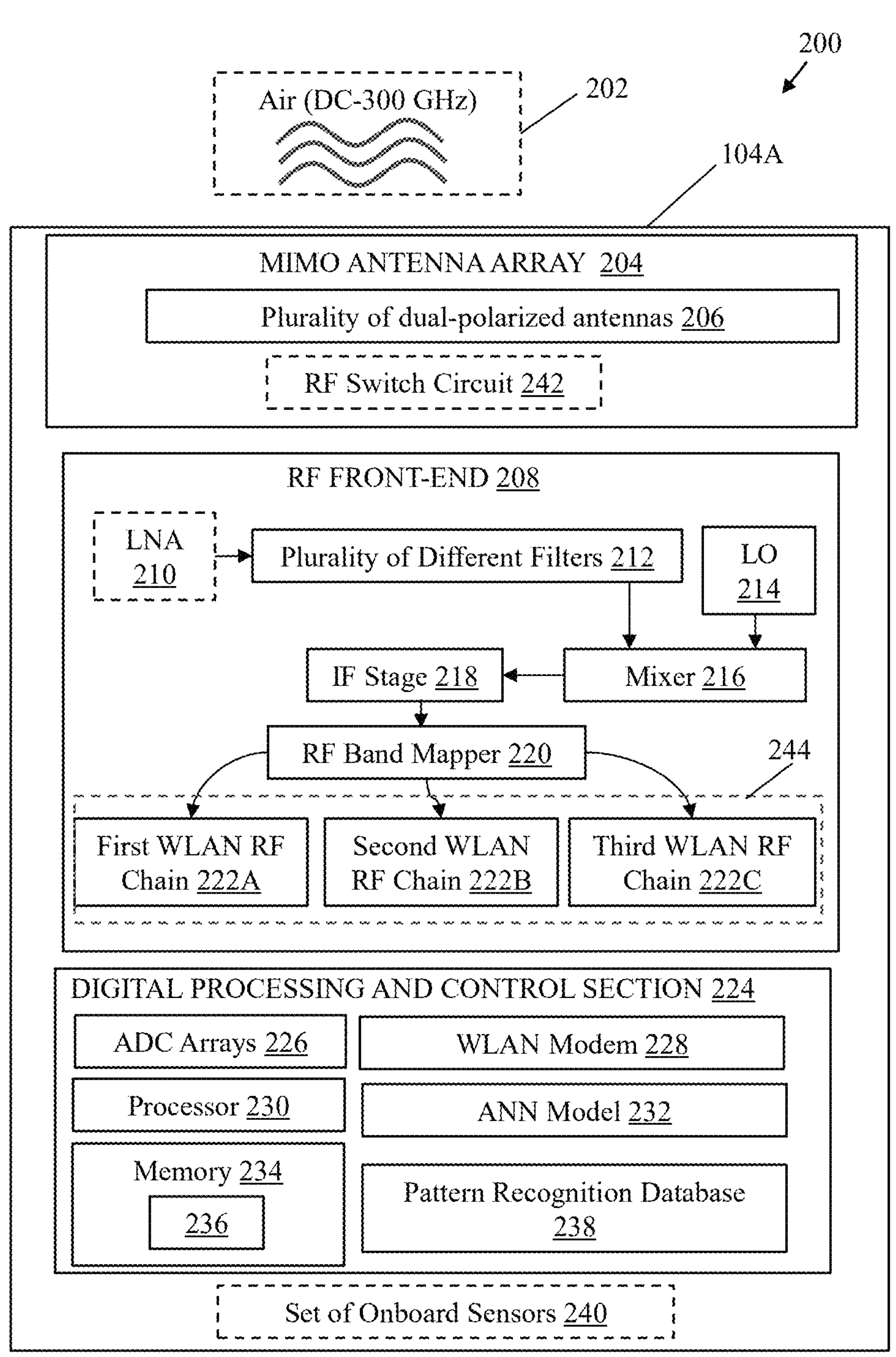
FIG. 2 is a block diagram that illustrates various components of an exemplary wireless communication device for enhanced detection and processing of spread spectrum signals, in accordance with an exemplary embodiment of the disclosure.

FIG. 2 is a block diagram that illustrates various components of an exemplary wireless communication device for enhanced detection and processing of spread spectrum signals, in accordance with an exemplary embodiment of the disclosure. FIG. 2 is explained in conjunction with elements from FIG. 1. With reference to FIG. 2, there is shown a block diagram 200 of the wireless communication devices 104A. The wireless communication devices 104A may include an antenna array system, such as a multiple-input-multiple-output (MIMO) antenna array 204. The MIMO antenna array 204 may include a plurality of dual-polarized antennas 206. In an implementation, the antenna array system, such as the MIMO antenna array 204 may include a radio frequency (RF) switch circuit 242. The wireless communication devices 104A may include an RF front-end 208 and a digital processing and control section 224.

The RF front-end 208 may include a Low-Noise Amplifier (LNA) 210, a plurality of different filters 212, a local oscillator 214, a mixer 216, an intermediate frequency (IF) stage 218, an RF band mapper 220, a WLAN radio (e.g., an IEEE 802.11be radio) comprising distinct RF chains for concurrent operations across different frequency bands, such as a first WLAN RF chain 222A (e.g., RF chain 1 for 2.4 GHz band processing), a second WLAN RF chain 222B (e.g., RF chain 2 for 5 GHz band processing), and a third WLAN RF chain 222C (e.g., RF chain 3 for 6 GHz band processing). Each chain may comprise dedicated components (LNA, mixers, filters) optimized for its specific frequency band, enabling concurrent multi-band operation (not shown for the sake of brevity).

The digital processing and control section 224 may be configured to handle digital processing (e.g., analog to digital conversions, digital signal processing, multi-link operations (MLO) processing, baseband processing etc.,), WLAN modem functions, as well as system control functions (e.g., a system on a chip (Soc)). The digital processing and control section 224 may include ADC arrays 226, a WLAN modem 228, a processor 230, an artificial neural network (ANN) model 232, a memory 234 with an MLO manager 236, and a pattern recognition database 238. In an implementation, the wireless communication devices 104A may further include a set of onboard sensors 240.

The MIMO antenna array 204 may include the plurality of dual-polarized antennas 206 configured to receive radio frequency signals in vertical and horizontal polarizations across the plurality of frequency bands, for example, ranging from direct current (DC) to 300 GHz. The MIMO antenna array 204 may incorporate dedicated MIMO elements for 2.4/5/6 GHz Wi-Fi® bands and wideband elements for full spectrum coverage enabling comprehensive spectrum sensing capabilities across multiple frequency bands (i.e., not only supports primary coverage from 1-7 GHz but manifest extended range capability to DC-300 GHz through multi-stage conversion operations).

The RF front-end 208 may be configured to apply band-specific filtering operation to the received radio frequency signals to isolate signals-of-interest, for example, with at least 50 decibels of spurious signal suppression. In an implementation, the RF front-end 208 may maintain a noise figure below 3 decibels and phase noise performance of −110 dBc/Hz at 10 kHz offset with dynamic range exceeding 90 decibels. The RF front-end 208 may comprise low noise amplification stages, pre-filtering components, first stage mixing with local oscillator, and initial intermediate frequency stage processing.

The RF band mapper 220 may be configured to perform mapping of received radio frequency signals to predefined intermediate frequencies (e.g., 2.4 GHz, 5 GHZ, or 6 GHz). The RF band mapper 220 may enable concurrent processing of signals across multiple frequency bands. The RF band mapper 220 may perform demultiplexing of signals into WLAN bands (Wi-Fi® bands) and provide dedicated signal paths for 2.4/5/6 GHz processing with multi-stage frequency conversion.

The ADC arrays 226 may refer to analog-to-digital converter arrays configured to digitize the down-converted signals for processing. The WLAN modem 228 may refer to a wireless local area network modem configured to handle baseband signal processing, including digital processing operations such as Fast Fourier Transform (FFT)/Inverse Fast Fourier Transform (IFFT), signal equalization, Medium Access Control (MAC) layer processing, and Quality of Service (QoS) management.

The processor 230 may be configured to execute spectrum analysis, signal classification, and cross-band correlation across multiple intermediate frequency bands (e.g., 5 GHz and 6 GHz). The processor 230 may be part of Soc and may incorporate one or more processing units including Central Processing Unit (CPU), Neural Processing Unit (NPU), and Digital Signal Processor (DSP) for specialized signal processing tasks.

The memory 234 may refer to a storage configured to store processing data and signal patterns. The memory 234 may provide hierarchical memory architecture for efficient data access and processing. Examples of implementation of the memory 234 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The MLO manager 236 may refer to a multi-link operation manager configured to control concurrent processing across multiple frequency bands and manage system interfaces for coordinated operation.

The pattern recognition database 238 may refer to a database system configured to maintain historical signal correlation patterns and update correlation thresholds based on pattern recognition results, enabling adaptive learning and pattern evolution tracking.

The set of onboard sensors 240 refers to environmental and operational sensors configured to provide supplementary data to support signal classification and threat assessment capabilities, where the sensors enable enhanced contextual awareness for signal processing decisions. For example, the set of onboard sensors 240 may include one or more image sensors, a light detection and ranging (Lidar) sensor, a radio detection and ranging (Radar), a spatial position sensor, an inertial measurement unit (IMU) sensor, and a temperature sensor. A wide range of sensors may be integrated or connected to enrich each wireless communication device 104A with environmental awareness for intelligent intra-node and inter-node optimizations. For example, the one or more image sensors may be used to visually monitor the surroundings of each network node. The lidar sensor may be referred to as light detection and ranging sensors used to enable accurate three-dimensional (3D) profiling and depth perception of surroundings of each network node for precise beam alignment. The Radar may be a built-in radar to detect and track motion to monitor movement patterns of surrounding objects and predict potential RF signal blockers. The spatial position sensor may be a global navigation satellite system (GNSS) sensor, such as global positioning system (GPS) to provide location awareness for each network node used for geospatial analytics and positioning capabilities. The IMU sensor may include a combination of accelerometers, gyroscopes, and magnetometers (sometimes magnetometers may not be used) that typically measures the body's specific force, angular rate, and orientation of a given body. In such a case, such raw IMU output may be processed to measure node vibrations, shocks, and orientation changes at each network node.

The RF switch circuit 242 may refer to a radio frequency switch circuit configured to route signals between multiple antenna elements with switching time less than 100 microseconds and frequency step size of 100 kHz. The RF switch circuit 242 allows rapid transitions between frequency bands for continuous spectrum monitoring. In an implementation, the RF switch circuit 242 may be configured to perform dynamic beam steering by switching between different phased antenna arrays installed at different positions around the wireless communication device 104A to route RF signals along different directions as required. The continuous spectrum monitoring and dynamic beam steering enables adaptable signal propagation, responding to changing network conditions and optimizing communication paths for improved reliability and performance.

In operation, in accordance with an embodiment, the plurality of dual-polarized antennas 206 may be configured to receive radio frequency (RF) signals in vertical and horizontal polarizations across a plurality of frequency bands. The wireless communication device 104A may include one or more MIMO antenna arrays, such as the MIMO antenna array 204. Each of the one or more MIMO antenna arrays, such as the MIMO antenna array 204, may include the plurality of dual-polarized antennas 206. In FIG. 2, the RF signals in the air captured by the MIMO antenna array 204 may be represented by wavy lines (i.e., the airwave 202). As an example, the MIMO antenna array 204 may be a 4×4 MIMO array. In an implementation, the MIMO antenna array 204 may be an antenna array system that may include one or more wide array antennas and may provide 360° coverage pattern. In an implementation, the MIMO antenna array 204 may include four independent antenna elements with different phases (0°, 90°, 180°,) 270°. The MIMO antenna array 204 may be configured to receive multiple independent data streams concurrently on different antennas, effectively increasing capacity without requiring more bandwidth and when receiving the same signal from different antennas may provide diversity gain to combat fading and improve signal reliability. Further, the plurality of dual-polarized antennas 206 are configured to enhance signal reception and improve spectral efficiency by capturing RF signals in both vertical and horizontal polarizations across multiple frequency bands. For example, each antenna element within the MIMO antenna array 204 may be equipped with orthogonally oriented dipoles or patch radiators that are capable of concurrently receiving RF signals in both vertical and horizontal polarization planes. In such a case, since each antenna element may support two independent polarization modes (vertical and horizontal), the combination of MIMO with dual polarization effectively doubles the data communication capacity without increasing bandwidth or frequency usage. Further, as the plurality of dual-polarized antennas 206 allow two independent communication channels per antenna, the need for additional physical antennas is reduced, which may be useful for space-limited applications for compact antenna design and contribute to portability of the wireless communication device 104A. The combination of the MIMO feature with the dual-polarized antennas allows the wireless communication device 104A to capture signals from multiple spatial points and enhances detection accuracy with full polarization coverage for all types of transmissions.

In accordance with an embodiment, the plurality of frequency bands captured by the MIMO antenna array 204 may range from DC to 100 gigahertz (GHz). The wireless communication device 104A may perform a real-time, wideband spectrum monitoring across frequencies ranging from DC to 100 GHz with high resolution (for example, down to about 19 kHz). In accordance with an embodiment, the plurality of frequency bands captured by the MIMO antenna array 204 may range from direct current (DC) to 300 gigahertz (GHz). The frequency range of the plurality of frequency bands captured by the MIMO antenna array 204 depends on the specific use case, ranging from DC to 100 GHz for telecommunications infrastructure monitoring and Internet-of-Things (IoT) applications, or from DC to 300 GHz for advanced radar systems, atmospheric research, and millimeter-wave sensing applications. The DC to 100 GHz configuration provides sufficient bandwidth for analyzing 5G networks, Wi-Fi® 6E/7 systems, cellular backhaul communications, industrial sensor networks operating within defined wireless frequency allocations, and unknown or spread spectrum signals operating within the DC to 100 GHz range as per operational requirements. The extended DC to 300 GHz configuration enables comprehensive analysis of automotive radar systems operating at 77-81 GHz, weather monitoring radar at 94 GHz, security imaging systems, and scientific research applications requiring coverage of the complete millimeter-wave spectrum up to sub-terahertz frequencies. The wireless communication device 104A may be a multi-function device for adaptive RF spectrum analysis as well as wireless data communication to one or more wireless communication devices 104B, 104C, . . . , 104N in the wireless mesh network 106. Each network node functions as both a spectrum analyzer and a high-speed communication endpoint.

In accordance with an embodiment, the RF front-end 208 is further configured to apply band-specific filtering to the received RF signals to isolate signals of interest. The RF front-end 208 is further configured to down-convert and digitize the signals-of-interest to predefined intermediate frequencies corresponding to the plurality of different intermediate frequency bands to obtain the digitized down-converted signals. The plurality of frequency bands ranges from direct current (DC) to 300 gigahertz (GHz). The RF front-end 208 further may comprise the plurality of different filters 212 for the band-specific filtering operation of the received RF signals for the isolation of the signals of interest along, for example, with at least 50 decibels (dB) of spurious signal suppression. In an implementation, the LNA 210 may be placed before pre-filtering stage, as spectrum monitoring may often involve detecting weak or distant signals (e.g., covert transmissions, military radar, low-power IoT devices). Further, to sniff RF signals from the airwave 202, especially the broad frequency range (e.g., DC-100 GHz), the LNA 210 first approach ensures that signals across all frequencies are captured with minimal loss before band-specific filtering operation. The LNA 210 may amplify such weak signals before they encounter any filtering losses, improving detection accuracy. In some implementations, the LNA 210 may not be placed before the plurality of different filters 212 to reduce out-of-band interference. The wireless communication device 104A may evaluate spectrum monitoring performance with the LNA 210 positioned before pre-filtering compared to operation without the LNA 210 (e.g., the LNA 210 bypassed) to determine which configuration provides better signal detection accuracy.

In an example, the plurality of different filters 212 may be pre-filters that may process signals across distinct frequency ranges, where low band filtering may operate from 50 MHz to 1 GHz to eliminate interference from TV, FM, and LTE signals, mid band filtering may operate from 1 GHz to 3 GHz to suppress cellular and adjacent Wi-Fi® bands, and high band filtering may operate from 3 GHz to 100 GHz and above to isolate high-frequency signals from 5G, radar, and millimeter-wave sources. In an implementation, the RF front-end 208 may employ a multi-stage filtering architecture that may include cavity filters providing high-Q resonance, Surface Acoustic Wave (SAW) filters, and Bulk Acoustic Wave (BAW) filters for precise frequency selectivity. In some implementation, the wireless communication device 104A may implement an adaptive digital filtering operation using DSP-based notch filters after the analog filtering stage, which may enhance the overall spurious signal rejection capabilities. Further, the implementation of narrowband bandpass filters may enable selective passing of signals-of-interest while maintaining substantial attenuation of unwanted RF signals, wherein the multi-stage spurious suppression operations may achieve 50-80 dB of rejection. The comprehensive filtering operation may be particularly advantageous in dense RF environments where multiple interfering signals may be present, enabling the system to effectively isolate and monitor specific frequency bands of interest while maintaining high signal quality through robust interference suppression.

In accordance with an embodiment, the RF front-end 208 may be further configured to down-convert and digitize the isolated signals-of-interest to predefined intermediate frequencies to obtain digitized down-converted signals. In an implementation, the RF front-end 208 may employ the mixer 216 and the LO 214 configuration, where the mixer 216 may combine the filtered RF signals with the LO-generated stable frequency to produce sum and difference frequencies. The difference frequency (RF-LO frequency) may be selected as the desired intermediate frequency (IF), such as 5 GHZ, 6 GHZ, or 7 GHz while the sum frequency may be discarded. In such a case, the IF selection may be predetermined ensuring compatibility with subsequent digitization hardware (e.g., the IEEE 802.11be chipset, such as the WLAN radio 244 and the WLAN modem 228). The down-conversion to predefined intermediate frequencies allows the wireless communication device 104A to leverage, for example, the IEEE 802.11be chipset's processing architectures, reducing hardware complexity, while re-purposing for enhanced spectrum monitoring as well as wireless data communication. The down-converted IF signals may then be processed through an Analog-to-Digital Converter (ADC) that may sample and convert the analog IF signals into digital form. Further, the selection of predefined intermediate frequencies may be specifically configured to avoid interference from other signals while matching ADC bandwidth and resolution requirements. The down-conversion and digitization operation may enable advanced digital signal processing capabilities, including real-time filtering, demodulation, and pattern recognition, which may be particularly beneficial for spectrum monitoring applications requiring signal classification, anomaly detection, and cognitive RF adaptation for interference mitigation.

In accordance with an embodiment, the radio frequency (RF) front-end 208 may be further configured to perform an RF mapping of the received RF signals in the plurality of frequency bands to one of the predefined intermediate frequencies corresponding to a first intermediate frequency band or a second intermediate frequency band. The first intermediate frequency band may be different from the second intermediate frequency band. Each of the predefined intermediate frequencies corresponding to the first intermediate frequency band and the second intermediate frequency band is one of: 2.4 GHZ, 5 GHZ, 6 GHZ, 7 GHZ, or an unlicensed or Industrial, scientific, and medical (ISM) frequency band. The RF band mapper 220 may be configured to demultiplex the obtain digitized down-converted signals in the predetermined intermediate frequencies (e.g., a common intermediate frequency or one or more predetermined intermediate frequencies) into different WLAN frequency bands (e.g., 2.4 GHz, 5 GHZ, and 6 GHz) and may assign dedicated paths for efficient processing. The frequency mapping may ensure that the signals are optimally allocated and processed based on resource availability. Based on the resource status, the best IF band assignment out of the different WLAN frequency bands may be done. Once the RF mapping is complete, the digitized down-converted signals signal may then be processed.

In an example, the RF mapping may incorporate channel and spatial mapping capabilities, wherein each frequency band may be divided into distinct channels, and spatial mapping may be performed to improve beamforming and interference management. The wireless communication device 104A may implement a resource allocation mechanism that may dynamically check available resources and perform load balancing across the 2.4/5/6 GHz bands based on congestion levels. Further, the RF front-end 208 may assign dedicated processing paths to the different WLAN frequency bands, where the signals may undergo specific filtering, mixing, and digitization processes based on predefined IF mapping configurations. The RF front-end 208 may assign to the WLAN radio 244 (e.g., an IEEE 802.11be radio) comprising distinct RF chains for concurrent operations across different frequency bands, such as the first WLAN RF chain 222A (e.g., RF chain 1 for 2.4 GHz band processing), the second WLAN RF chain 222B (e.g., RF chain 2 for 5 GHz band processing), and the third WLAN RF chain 222C (e.g., RF chain 3 for 6 GHz band processing). Each chain may comprise dedicated components (LNA, mixers, filters) optimized for its specific frequency band, enabling simultaneous multi-band operation. The comprehensive RF mapping operation may enable efficient spectrum utilization and optimal signal processing, particularly beneficial for next operation of implementing Multi-Link Operation (MLO) that may require dynamic frequency assignment across multiple bands while maintaining minimal interference and maximum processing efficiency.

In accordance with an embodiment, the processor 230 may be configured to set a plurality of operational parameters to process digitized down-converted signals. The digitized down-converted signals may be input signals in a plurality of different intermediate frequency bands. In an implementation, the processor 230 may initialize a set of plurality of operational parameters at the wireless communication device 104A prior to digital signal processing. The plurality of operational parameters may determine how the processor 230 processes incoming digitized signals that have been down-converted from the original RF frequencies to various intermediate frequency (IF) bands. The plurality of operational parameters may comprise two or more of: radio frequency (RF) front-end parameters, signal processing parameters, multiple-input-multiple-output (MIMO) parameters, multi-link operation (MLO) parameters, domain-specific feature extraction parameters, or signal pattern classification parameters.

In accordance with an embodiment, the RF front-end parameters of the plurality of operational parameters may be filter bandwidths, gain settings, or noise floor thresholds, configured to increase initial signal reception across multiple IF bands. The RF front-end parameters may comprise specific configurations useful to optimize multi-band signal reception in the wireless communication device 104A (e.g., a Wi-Fi® 7 integrated device). The filter bandwidths may be initially configured for each intermediate frequency band (2.4 GHZ, 5 GHZ, and 6 GHz) with appropriate channel widths (20/40/80/160/320 MHz) to isolate signals of interest while rejecting out-of-band interference. The gain settings may control signal amplification throughout the RF chain, including low noise amplifier (LNA) gain (10-30 dB), variable gain amplifier (VGA) settings (0-40 dB), and Automatic Gain Control (AGC) parameters, which may be set to ensure adequate signal strength for processing while preventing saturation or distortion. The noise floor thresholds may establish detection sensitivity levels, including baseline noise floor measurements, detection thresholds (typically 6-10 dB above noise floor), and adaptive threshold parameters for dynamic environments. These parameters may influence signal reception and may require proper initialization before digital signal processing begins, with subsequent fine-tuning based on real-time performance feedback to maintain optimal system performance across varying RF environments.

In accordance with an embodiment, the signal processing parameters of the plurality of operational parameters may include sampling rates, window functions, and fast Fourier transform (FFT) sizes that may be specifically tailored to the characteristics of each IF band. The signal processing parameters may be configurations that determine how digitized signals are analyzed across different intermediate frequency bands in the wireless communication device 104A. The sampling rates may define the frequency of analog signal measurement during analog-to-digital conversion, for example, requiring 80-160 Million Samples per second (MSps) for 2.4 GHz band, 200-400 MPs for 5 GHz band, and 400-640 MSps for 6 GHz band with 320 MHz channels, selected to satisfy the Nyquist criterion to prevent aliasing. The window functions, including Hamming (general analysis), Blackman (high dynamic range), and Rectangular (transient detection), may shape how signal segments are analyzed, providing essential trade-offs between frequency resolution and spectral leakage. The FFT sizes may determine frequency resolution and processing granularity, ranging from smaller sizes (512-1024 points) for faster processing, medium sizes (2048-4096 points) for balanced operation, to larger sizes (8192-16384 points) for high-resolution analysis of complex signals. Such parameters may be configured initially based on expected signal characteristics and operational requirements to optimize detection sensitivity, frequency resolution, and discrimination between legitimate signals and interference, all while being subject to adaptive optimization during system operation.

In accordance with an embodiment, the multiple-input-multiple-output (MIMO) parameters of the plurality of operational parameters may include configurations that govern spatial signal processing in the wireless communication device 104A equipped with multiple antenna arrays, such as the MIMO antenna array 204. The MIMO parameters may include beamforming weights, including phase coefficients (0-360° with sub-degree resolution), amplitude weights (0-1 normalized values), and update rates (1-10 ms), which collectively may determine how signals from multiple antennas combine to enhance reception in specific directions. The null steering parameters that may include null depth specifications (20-40 dB of suppression), angular width configurations (5-20° depending on selectivity requirements), and maximum simultaneous null count (typically 1-3 for 4×4 MIMO) may also be part of the MIMO parameters, which may control the wireless communication device's 104A ability to mitigate spatial interference. Spatial correlation thresholds, including correlation coefficient thresholds (0.7-0.95), spatial diversity gain settings (3-10 dB), and angle of arrival precision parameters (5-15° resolution), may establish criteria for identifying spatially related signals. Such parameters may be initially configured to establish baseline spatial processing capabilities before the system 100 adaptively adjust the parameters when in operation, thereby enabling enhanced signal detection, effective interference mitigation, and accurate direction-finding capabilities useful for comprehensive spectrum monitoring in complex RF environments.

In accordance with an embodiment, the multi-link operation (MLO) parameters of the plurality of operational parameters may correspond to configurations that may enable synchronized operation across multiple frequency bands in Wi-Fi® 7 chipset integrated device, like the wireless communication device 104A. The MLO parameters may include band synchronization timing (with precision typically <1 μs), cross-band coordination settings (controlling link aggregation and load balancing across 2.4 GHZ, 5 GHZ, and 6 GHz bands), resource allocation priorities (determining which bands receive processing priority based on signal characteristics), timing reference selection (establishing primary and secondary timing sources), correlation windows (typically 1-10 ms for cross-band pattern detection), and link quality thresholds (SNR requirements of 15-25 dB for reliable operation). These MLO parameters may be initially configured to ensure time-aligned processing across bands, enabling useful capabilities such as cross-band correlation for detecting frequency hopping signals, coordinated interference detection across multiple bands, synchronous feature extraction, and coherent pattern recognition. The MLO configuration may influence the system's ability to detect and analyze sophisticated signals that operate across multiple frequency bands, significantly enhancing spectrum monitoring capabilities beyond what single-band systems can achieve.

The processor 230 is further configured to determine a signal type is one of a spread spectrum signal or a non-spread spectrum signal based on a signal-type analysis on digitized down-converted signals. The digitized down-converted signals are input signals in the plurality of different intermediate frequency bands. The plurality of different intermediate frequency bands corresponds to two or more of 2.4 gigahertz (GHz), 5 GHZ, 6 GHZ, 7 GHZ, or an unlicensed or Industrial, scientific, and medical (ISM) frequency band. The spread spectrum signal may be a signal having a transmission bandwidth that exceeds a defined minimum bandwidth required to transmit information content by a factor of at least two, where the bandwidth expansion is accomplished by a spreading code or frequency hopping pattern that is independent of the information being transmitted. The spread spectrum signal intentionally spreads energy across a much wider frequency bandwidth than required for the original data transmission, using techniques like frequency hopping or direct sequence coding to enhance security and interference resistance. The non-spread spectrum signal may be a signal having a transmission bandwidth that does not exceed twice the defined minimum theoretical bandwidth required to transmit the information content, where the signal uses standard modulation techniques without intentional bandwidth expansion through spreading codes or frequency hopping. The non-spread spectrum signal occupies only the defined minimum bandwidth necessary to transmit its data without intentional spreading, using known modulation techniques like amplitude, frequency, or phase modulation.

In accordance with an embodiment, the processor 230 may be configured to execute a signal-type analysis operation that analyzes bandwidth characteristics and spectral distribution patterns of the digitized down-converted signals across the plurality of different intermediate frequency bands including 2.4 GHZ, 5 GHZ, 6 GHZ, or 7 GHz bands. The processor 230 may be configured to calculate signal bandwidth measurements by applying FFT operations to determine frequency occupancy patterns. The processor 230 may be configured to measure spectral spread characteristics using power spectral density analysis. The processor 230 may be configured to evaluate time-frequency variations through spectrogram generation to identify rapid frequency changes indicative of frequency hopping spread spectrum signals or bandwidth expansion patterns characteristic of direct sequence spread spectrum signals. The processor 230 may be configured to compare the calculated bandwidth measurements against predefined threshold values where bandwidth expansion exceeding chip rate thresholds indicates direct sequence spread spectrum signals and frequency change rates exceeding hop thresholds identify frequency hopping spread spectrum signals. The chip rate thresholds refer to the minimum data transmission rate used in direct sequence spread spectrum (DSSS) to determine when a signal exhibits spread spectrum characteristics. The processor 230 may be configured to determine spectral occupancy patterns matching spreading sequence characteristics to confirm spread spectrum signal types. The processor 230 may be configured to classify the digitized down-converted signals as spread spectrum signals when bandwidth utilization exceeds a defined data rate requirement or exhibits rapid frequency transitions. The spread spectrum signals undergo the multi-dimensional signal state processing operations while non-spread spectrum signals utilize standard signal processing process for computational efficiency.

In accordance with an embodiment, the processor 230 is further configured to select a first signal processing path from amongst a plurality of signal processing paths when the determined signal type is the spread spectrum signal. The processor 230 is further configured to select a second signal processing path from amongst the plurality of signal processing paths when the determined signal type is the non-spread spectrum signal. The processor 230 may be configured to route the digitized down-converted signals to the first signal processing path when the signal-type analysis identifies spread spectrum characteristics. The first signal processing path executes multi-dimensional signal state processing operations that generate a plurality of signal state representations for enhanced detection capabilities. The processor 230 may be configured to direct the digitized down-converted signals to the second signal processing path when the signal-type analysis determines non-spread spectrum signal characteristics. The second signal processing path applies cross-band correlation operations between the first intermediate frequency band and the second intermediate frequency band to identify related signal patterns. The processor 230 may be configured to improve computational resource allocation by applying quantum-inspired processing operations only to spread spectrum signals through the first signal processing path while utilizing reduced processing overload for non-spread spectrum signals through the second signal processing path.

The processor 230 is further configured to execute a multi-dimensional signal state processing operation to generate a plurality of signal state representations for each intermediate frequency band of the plurality of different intermediate frequency bands when the determined signal type is the spread spectrum signal. The plurality of signal state representations includes two or more of: a time domain state representation, a frequency domain state representation, a phase state representation, an amplitude state representation, or a wavelet state representation. The processor 230 may be configured to process the digitized down-converted signals across a plurality of distinct signal domains including spectral domain, temporal domain, spatial domain, and polarization domain. The processor 230 may be configured to perform spectral domain analysis by applying FFT operations to extract frequency components and power spectral densities, for example, across 320 MHz channels. The processor 230 may be further configured to execute temporal domain analysis by examining signal durations and packet sequences to identify protocol-specific characteristics. The processor 230 may be further configured to conduct spatial domain analysis by utilizing phase differences between MIMO antenna elements of the plurality of dual-polarized antennas 206 to determine direction-of-arrival information. The processor 230 may be configured to perform polarization domain analysis by processing vertical and horizontal signal components from the dual-polarized antennas 206.

In accordance with an embodiment, the processor 230 may be configured to extract domain-specific features from each signal domain for comprehensive signal characterization. The processor 230 may be configured to extract power spectral density measurements and bandwidth utilization metrics from the spectral domain. The processor 230 may be configured to extract signal duration measurements and inter-packet gap information from the temporal domain. The processor 230 may be configured to extract direction-of-arrival information and MIMO channel information from the spatial domain. The processor 230 may be configured to extract vertical-horizontal polarization ratios and cross-polarization discrimination values from the polarization domain. The processor 230 may be configured to generate a fused feature vector for each intermediate frequency band by consolidating the extracted domain-specific features into a unified multi-dimensional data structure including 16-64 elements.

In accordance with an embodiment, the processor 230 may be configured to convert the fused feature vector into the plurality of signal state representations by applying signal state transform operations. The processor 230 may be configured to create the time domain state representation through temporal mapping functions that preserve timing relationships in the original signal characteristics. The processor 230 may be configured to generate the frequency domain state representation through FFT-based transformations applied to spectral properties. The processor 230 may be configured to derive the phase domain state representation through Hilbert transform phase extraction operations. The processor 230 may be configured to construct amplitude state through complex signal magnitude calculations. The processor 230 may be configured to generate the wavelet state representation through time-frequency transformation matrices for multi-resolution analysis. The processor 230 may be configured to assign probability weights ranging from 0.1 to 0.4 to each state representation and may be configured to process all state representations concurrently for enhanced detection of complex spread spectrum patterns.

In accordance with an embodiment, the processor 230 may be configured to synchronize the domain-specific processing operations using MLO timing references to ensure analysis results correspond to the same 10 ms time windows across all domains of the plurality of distinct signal domains. The processor 230 may be configured to apply principal component analysis (PCA) operations with variance retention settings, for example, of 95% for detailed analysis to reduce 64 original features to 32 components while preserving signal information content. The processor 230 may be configured to implement concurrent processing pathways using buffer sizes of, for example, 4096 samples for 5 GHz band and 8192 samples for 6 GHz band with dedicated memory allocation for each state representation. The processor 230 may be configured to execute transformation matrix operations including Hilbert transform coefficients for phase extraction and wavelet coefficients for time-frequency decomposition. The wireless communication device 104A detects sophisticated spread spectrum signals that exhibit distinctive characteristics distributed across multiple state representations, such as frequency hopping transmissions with coordinated patterns across time, frequency, and phase domains.

In accordance with an embodiment, the processor 230 is further configured to assign a corresponding weight to each of the generated plurality of signal state representations. The processor 230 may be configured to calculate weight values for each signal state representation based on signal quality metrics including signal-to-noise ratio measurements, confidence scores derived from feature extraction processes, and reliability assessments of each state representation's contribution to pattern detection accuracy. The processor 230 may be configured to assign probability weights ranging, for example, from 0.1 to 0.4 for each state representation. The time domain state representation may receive weight based on temporal signal clarity. The frequency domain state representation may receive weight based on spectral resolution quality. The phase domain state representation may receive weight based on phase coherence measurements. The amplitude state representation may receive weight based on signal magnitude stability. The wavelet state representation may receive weight based on time-frequency resolution effectiveness. The processor 230 may be configured to normalize the assigned weights to ensure the total weight sum equals unity across all state representations for each intermediate frequency band. For example, for 5 state representations, the weights might be $0.3+0.25+0.2+0.15+0.1=1.0$ (unity).

In accordance with an embodiment, the processor 230 is further configured to generate a composite signal state based on a weighted combination of the generated plurality of signal state representations. The processor 230 may be configured to generate the composite signal state by applying combination operations that multiply each signal state representation by its corresponding assigned weight and sum the weighted results to create a unified representation. The processor 230 may be configured to execute weighted linear combination operations where the composite signal state equals the sum of each weighted state representation, thereby preserving the most significant characteristics from each individual state while reducing noise and redundancy. The processor 230 may be configured to update the weight assignments dynamically based on real-time performance feedback and signal environment conditions. The processor 230 may be configured to utilize the composite signal state for enhanced pattern recognition operations that leverage the combined strengths of all individual signal state representations, thereby improving detection accuracy for complex spread spectrum signals across each intermediate frequency band of the plurality of different intermediate frequency bands.

In accordance with an embodiment, the processor 230 is further configured to execute a multi-state correlation operation when the determined signal type is the spread spectrum signal. The processor 230 may be configured to execute the multi-state correlation operation by analyzing correlations between different signal state representations within the same intermediate frequency band and across different intermediate frequency bands. The processor 230 may be configured to compute correlation coefficients between the time domain state representation and the frequency domain state representation, between the phase domain state representation and amplitude state representation, and between the wavelet state representation and different state representations to identify relationships that reveal spread spectrum characteristics. The processor 230 may be configured to calculate cross-correlation functions using sliding window operations with configurable time windows ranging from 1-10 milliseconds to detect temporal patterns and phase relationships between different state representations.

In accordance with an embodiment, the processor 230 is further configured to compute an intra-band correlation concurrently among the generated plurality of signal state representations within same intermediate frequency band of the plurality of different intermediate frequency bands for the multi-state correlation operation. The processor 230 may be configured to execute concurrent correlation computations within each intermediate frequency band by calculating correlation coefficients between all possible pairs of signal state representations. The processor 230 may be configured to implement concurrent processing operations that concurrently compute correlation matrices for each intermediate frequency band where correlation coefficients are calculated using operations including Pearson correlation analysis, cross-correlation functions with configurable lag parameters, and normalized dot product calculations to quantify the degree of linear relationship between different state representations. The processor 230 may be configured to utilize dedicated processing threads or computational resources for each intermediate frequency band to ensure that intra-band correlation analysis occurs concurrently across the 2.4 GHz, 5 GHZ, 6 GHz, and 7 GHz bands without sequential processing delays.

In accordance with an embodiment, the processor 230 is further configured to compute an inter-band correlation concurrently between two or more corresponding signal state representations across the plurality of different intermediate frequency bands for the multi-state correlation operation. The processor 230 may be configured to execute concurrent inter-band correlation computations by calculating correlation coefficients between corresponding signal state representations across different intermediate frequency bands including the time domain state representation from the first intermediate frequency band with the time domain state representation from the second intermediate frequency band. Similarly, the processor 230 may be configured to calculate correlation coefficients between the frequency domain state representation from the first intermediate frequency band (e.g., 5 GHz band) with the frequency domain state representation from the second intermediate frequency band (e.g., 6 GHz band) and the phase state representation from the first intermediate frequency band with the phase state representation from the second intermediate frequency band. The processor 230 may be configured to implement concurrent processing operations that concurrently compare the amplitude state representation and the wavelet state representation across multiple intermediate frequency bands to detect coordinated signal activities, frequency hopping patterns, and multi-band spread spectrum transmissions. The processor 230 may be configured to utilize synchronized timing references from the MLO parameters to ensure that correlation computations compare signal state representations from the same temporal windows across different intermediate frequency bands, thereby maintaining temporal alignment necessary for accurate cross-band pattern detection.

As an example, the processor 230 may be configured to generate inter-band correlation coefficients ranging from −1.0 to +1.0 where values exceeding 0.95 indicate strong cross-band relationships suggesting coordinated multi-band transmissions, coefficients between 0.85 and 0.95 represent moderate correlations useful for identifying frequency hopping sequences, and values below 0.7 indicate weak or absent inter-band relationships. The processor 230 may be configured to apply configurable correlation thresholds based on signal environment complexity where stricter thresholds of 0.95 are used in low-interference conditions and more lenient thresholds of 0.75 are applied in challenging RF environments to balance detection sensitivity with false alarm rates. The processor 230 may be configured to utilize the computed inter-band correlations to identify frequency hopping spread spectrum signals that coordinate transitions across multiple intermediate frequency bands. The processor 230 may be configured to detect direct sequence spread spectrum signals that maintain consistent characteristics across different frequency bands. The processor 230 may be configured to recognize hybrid modulation schemes where correlation patterns between corresponding signal state representations reveal complex multi-band operational behaviors characteristic of advanced spread spectrum communication systems.

In accordance with an embodiment, the processor 230 is further configured to form a correlation matrix for the multi-state correlation operation based on the computed intra-band correlation and the inter-band correlation. The processor 230 may be configured to construct the correlation matrix by creating a structured two-dimensional array. The processor 230 may be configured to assign rows to represent signal state representations from different intermediate frequency bands. The processor 230 may be configured to assign columns to represent corresponding signal state representations across the plurality of different intermediate frequency bands. The processor 230 may be configured to populate matrix elements with intra-band correlation coefficients between the time domain state representation and the frequency domain state representation within the same intermediate frequency band. The processor 230 may be configured to insert inter-band correlation coefficients between the phase state representation from the first intermediate frequency band (e.g., 5 GHz band) and the phase state representation from the second intermediate frequency band (e.g., the 6 GHz band). The processor 230 may be configured to include cross-correlations between the amplitude state representation and the wavelet state representation across different intermediate frequency bands.

As an example, the processor 230 may be configured to ensure matrix symmetry where correlation coefficient between state representation A and state representation B equals the correlation coefficient between state representation B and state representation A. The processor 230 may be configured to utilize the correlation matrix as a unified data structure that consolidates all correlation relationships for comprehensive pattern analysis. The processor 230 may be configured to apply matrix analysis operations including eigenvalue decomposition to identify dominant correlation patterns. The processor 230 may be configured to execute singular value decomposition to extract principal correlation components. The processor 230 may be configured to perform threshold filtering to isolate correlation coefficients exceeding predetermined significance levels ranging, for example, from 0.7 to 0.95. The processor 230 may be configured to update the correlation matrix dynamically based on real-time signal conditions and may be configured to utilize the correlation matrix for identifying frequency hopping sequences, direct sequence patterns, and hybrid modulation schemes across the plurality of different intermediate frequency bands.

The processor 230 is further configured to determine one or more correlated signal patterns across the generated plurality of signal state representations when the determined signal type is the spread spectrum signal. The processor 230 may be configured to determine the correlated signal patterns by analyzing relationships between different signal state representations to identify coordinated signal behaviors that indicate spread spectrum characteristics. The processor 230 may be configured to examine temporal synchronization patterns where the time domain state representation from the first intermediate frequency band exhibits similar timing characteristics with the time domain state representation from the second intermediate frequency band, indicating coordinated signal activities across multiple bands. The processor 230 may be configured to detect spectral coordination patterns where the frequency domain state representation shows systematic frequency changes that correlate with corresponding frequency changes in different intermediate frequency bands, revealing frequency hopping sequences or multi-band transmission schemes.

In accordance with an embodiment, the processor 230 may be configured to identify phase relationship patterns where the phase state representation demonstrates coordinated phase transitions across different intermediate frequency bands that occur with specific timing intervals ranging from 1-10 milliseconds. The processor 230 may be configured to recognize amplitude coordination patterns where the amplitude state representation maintains consistent power level relationships across multiple intermediate frequency bands, indicating direct sequence spread spectrum characteristics. The processor 230 may be configured to detect complex modulation patterns where the wavelet state representation reveals time-frequency signatures that repeat or coordinate across different intermediate frequency bands with specific mathematical relationships. The processor 230 may be configured to utilize the correlation matrix as a computational tool that quantifies the strength of these pattern relationships through correlation coefficients ranging from −1.0 to +1.0. The processor 230 may be configured to apply pattern classification thresholds where correlation coefficients exceeding 0.85 indicate strong coordinated patterns characteristic of frequency hopping spread spectrum, coefficients above 0.8 suggest direct sequence spread spectrum patterns, and coefficients between 0.7-0.85 reveal hybrid modulation schemes across the plurality of different intermediate frequency bands.

As an example, the processor 230 may detect a frequency hopping pattern by monitoring that signal timing in the 5 GHz band matches signal timing in the 6 GHz band (both hop every 2 milliseconds), frequency changes coordinate between bands (when 5 GHz hops to 5.2 GHz, 6 GHz hops to 6.1 GHZ), and phase transitions occur simultaneously across both bands. The correlation matrix then quantifies these relationships with correlation coefficients of 0.92 for timing, 0.89 for frequency coordination, and 0.86 for phase relationships, confirming the coordinated frequency hopping pattern across multiple intermediate frequency bands.

The processor 230 is further configured to control the wireless communication device 104A to trigger an operational response based on the determined one or more correlated signal patterns. The operational response causes the wireless communication device 104A to execute one of a spectrum sensing and management action, a dynamic spectrum reallocation action to adjust spectrum resources, or a spectrum monitoring information distribution action across a plurality of wireless communication devices in the wireless mesh network 106. The wireless communication device 104A is one of the plurality of wireless communication devices 104A, 104B, 104C, . . . , 104N. The spectrum sensing and management action includes one of selection of a frequency band and a polarization type at the wireless communication device 104A for data communication above a defined data throughput, adjustment of spectrum analysis parameters at the wireless communication device 104A, or tracking and characterization of threat signals in a contested spectrum environment.

In accordance with an embodiment, the processor 230 may be configured to execute the spectrum sensing and management actions when the determined correlated signal patterns indicate legitimate spread spectrum communications. The spectrum sensing and management actions include several key functions. First, the processor 230 may select relevant frequency bands for signal monitoring while maintaining current communication links. Additionally, the processor 230 may adjust filter parameters of the plurality of different filters 212. The adjustment maintains signal quality based on the validated patterns including selecting relevant frequency bands for signal monitoring while maintaining current communication links and adjusting filter parameters of the plurality of different filters 212 to maintain signal quality based on validated patterns. The processor 230 may be configured to perform dynamic spectrum reallocation actions by switching between 2.4 GHZ, 5 GHZ, 6 GHZ, or 7 GHz bands based on interference levels detected through the correlated signal patterns. The processor 230 may be configured to improve bandwidth selection by choosing 320 MHz channels when higher throughput is needed or falling back to 160 MHz channels when appropriate based on pattern analysis results. The processor 230 may be configured to distribute spectrum monitoring information across the plurality of wireless communication devices 104B, 104C, and 104N in the wireless mesh network 106 when correlated signal patterns indicate network-wide coordination requirements.

In accordance with an embodiment, the processor 230 may be configured to execute jamming suppression operations when the determined correlated signal patterns indicate potential jamming signals by performing null steering through adaptive beamforming to minimize jamming signal reception while maintaining signal tracking capabilities. The processor 230 may be configured to generate threat assessment alerts when the correlated signal patterns match defined threat criteria including unauthorized frequency hopping sequences, anomalous power distribution patterns, or protocol timing violations that suggest malicious interference activities. The processor 230 may be configured to update the pattern recognition database 238 with newly identified correlated signal patterns and may be configured to adjust the plurality of operational parameters including correlation thresholds, detection sensitivity levels, and processing priorities based on operational response effectiveness measurements. The processor 230 may be configured to maintain continuous monitoring of frequency bands where correlated signal patterns were detected. The processor 230 may be configured to coordinate operational responses across multiple wireless communication devices through the wireless mesh network 106 to improve overall network performance and security against sophisticated spread spectrum threats.

In accordance with an embodiment, the processor 230 is further configured to perform a cross-band correlation across the plurality of different intermediate frequency bands based on configuration of multi-link operation (MLO) parameters in the wireless communication device 104A. Based on the cross-band correlation, the processor 230 is further configured to identify related signal patterns when the determined signal type is the non-spread spectrum signal. The cross-band correlation is independent of the generation of the plurality of signal state representations in the multi-dimensional signal state processing operation. The processor 230 may be configured to perform cross-band correlation by comparing signals between different frequency bands using MLO parameters. The processor 230 may be configured to use buffer sizes like 4096 samples for 5 GHz band and 8192 samples for 6 GHz band to temporarily store signal data. The processor 230 may be configured to apply sampling rates of, for example, 160 MHz for 5 GHz band and 320 MHz for 6 GHz band to capture signal information. The processor 230 may be configured to set correlation thresholds, for example, between 0.7 and 0.95 to determine when signals are related across bands. The processor 230 may be configured to synchronize timing across the plurality of different intermediate frequency bands using the MLO timing references so that signal comparisons occur at the same time windows.

As an example, the processor 230 may be configured to identify related signal patterns for non-spread spectrum signals by finding correlations above 0.85 between frequency bands that indicate normal Wi-Fi operations. The processor 230 may be configured to detect MLO transmissions where the same data appears on multiple bands concurrently. The processor 230 may be configured to recognize load balancing where traffic switches between the plurality of different intermediate frequency bands based on congestion. The processor 230 may be configured to identify channel bonding where adjacent channels combine for higher bandwidth. The processor 230 may be configured to operate the cross-band correlation separately from the complex multi-dimensional processing used for the spread spectrum signals. The processor 230 may be configured to use simple direct correlation methods for non-spread spectrum signals without creating multiple state representations, thereby saving computational resources. The processor 230 may be configured to reserve the complex quantum-inspired processing only for spread spectrum signals while using efficient conventional correlation for standard Wi-Fi® signals across the plurality of different intermediate frequency bands.

As an example, the MLO parameters may include buffer sizes for each Intermediate Frequency (IF) band that determine temporary data storage capacity (e.g., configured as powers of 2, like 4096 or 8192 samples), Fast Fourier Transform (FFT) window parameters (including window size, overlap percentage, and window function type) that control frequency resolution and processing accuracy, sampling rates for each Analog-to-Digital Converter (ADC) of the ADC arrays 226 that determine data acquisition speeds (e.g., 160 MHz for 5 GHz band, 320 MHz for 6 GHz band), cross-correlation thresholds that define sensitivity for pattern detection between bands (typically ranging from 0.7 to 0.95 for correlation coefficients), and memory allocation settings for continuous FFT buffers that manage ongoing computations through circular buffer implementations and cache-aligned memory allocation. The MLO parameters configuration may operate in concert to enable efficient concurrent processing, maintain processing continuity, prevent data loss, optimize resource utilization, and ensure reliable cross-band correlation, with the specific values being tuned based on hardware capabilities, processing requirements, signal characteristics, and system performance targets. For example, the concurrent processing of digitized down-converted signals in 5 GHz and 6 GHz bands may be implemented by first configuring MLO parameters where the 5 GHz band may utilize a 4096-sample buffer with 160 MHz sampling rate and 1024-point FFT processing, while the 6 GHz band employs a larger 8192-sample buffer with 320 MHz sampling rate and 2048-point FFT to accommodate its higher bandwidth requirements.

In accordance with an embodiment, the processor 230 is further configured to detect one or more signal patterns in a first pass based on output results of the plurality of signal processing paths. The processor 230 may be configured to receive output results from the first signal processing path that processed spread spectrum signals through multi-dimensional signal state processing operations and from the second signal processing path that processed non-spread spectrum signals through the cross-band correlation operations. The processor 230 may be configured to analyze the output results from the first signal processing path including correlation matrices, signal state representations, and pattern confidence scores to identify complex spread spectrum characteristics, such as frequency hopping sequences, direct sequence patterns, and hybrid modulation schemes. The processor 230 may be configured to examine the output results from the second signal processing path including cross-band correlation coefficients and MLO synchronization data to detect Wi-Fi® patterns such as multi-link operations, load balancing activities, and standard protocol behaviors.

As an example, the processor 230 may be configured to apply pattern detection operations to the combined output results using confidence thresholds ranging from, for example, 0.75 to 0.95 where detected patterns exceed defined confidence levels to be considered valid. The processor 230 may be configured to classify detected patterns into categories including legitimate signal communications from authorized sources, potential jamming signals requiring suppression actions, frequency hopping transmissions from moving sources, and unknown or anomalous signals requiring further analysis. The processor 230 may be configured to generate pattern detection results that include pattern type identification, confidence scores, frequency band locations, and temporal characteristics for each detected signal pattern. The processor 230 may be further configured to evaluate pattern detection success by calculating detection accuracy metrics, false alarm rates, and processing latency measurements from the first pass analysis. The processor 230 may be configured to determine whether detected patterns require additional processing iterations based on evaluations of the confidence score. The processor 230 may be configured to prepare pattern information for comparison against the pattern recognition database 238 to identify known signal types and update learning parameters when necessary.

In accordance with an embodiment, the processor 230 is further configured to compare the detected one or more signal patterns with known signal patterns in a pattern recognition database 238. The determined one or more signal patterns may be compared with known signal patterns in the pattern recognition database 238 by extracting a feature signature from the detected signal and calculating similarity metrics against reference patterns corresponding to the known signal patterns in the pattern recognition database 238. For example, when analyzing a frequency hopping signal in the 5 GHz band, the processor 230 may be configured to generate a pattern signature that may include key characteristics from the generated multiple state representations, for example, a 10 ms hop sequence pattern from the time domain state, distinctive spectral occupancy from the frequency domain state, and 0.87 phase coherence from the phase state. The multi-state signature may be then compared against the reference patterns using a weighted Euclidean distance operation (or weighted Euclidean distance algorithm) that may prioritize the most reliable features based on signal quality metrics. The similarity scores for each potential match may be calculated using the weighted Euclidean distance operation, with the highest score (0.92 in this example) indicating the most likely classification. When the similarity score exceeds the confidence threshold (0.85), the processor 230 may definitively classify the detected signal. In such a case, for example, the detected signal may be classified as a known frequency hopping jammer and may trigger the appropriate operational response based on the classification result. The comparison may enable the wireless communication device 104A to identify known signal types, detect variations of existing patterns, and isolate previously unobserved signal behaviors, ultimately improving classification accuracy and response time in wireless environments.

In accordance with an embodiment, the processor 230 is further configured to update the pattern recognition database 238 with the detected one or more signal patterns. The processor 230 is further configured to one or more cognitive learning parameters of the trained ANN model 232 when the detected one or more signal patterns are not found in the pattern recognition database 238. The processor 230 may match newly determined signal patterns against known patterns stored in the pattern recognition database 238. Once the processor 230 identifies a signal pattern that does not correspond to any existing entry in the pattern recognition database 238 (e.g., if matching score below a predefined similarity threshold), the processor 230 may trigger an update sequence for the artificial neural network model 232. When the processor 230 performs similarity scoring between a newly detected pattern and all existing patterns in the pattern recognition database 238, a comprehensive match score may be calculated using the weighted Euclidean distance operation across multiple signal state representations. When the highest similarity score falls below the defined threshold (e.g., less than 0.75), the processor 230 may initiate the cognitive learning update sequence. First, the processor 230 may construct a new pattern template by extracting and normalizing the multi-state features from the unrecognized signal, including spectral density patterns, temporal sequences, phase relationships, and spatial characteristics. The new pattern template may serve as the foundation for a training dataset, which the processor 230 may augment with multiple instances of the pattern captured over time with varying signal conditions. The processor 230 may then execute a neural network update operation, using backpropagation to systematically adjust synaptic weights between neurons in the hidden layers, modify activation function parameters, and update bias values. Such gradient-descent-based learning process may minimize pattern recognition error by iteratively optimizing the network's parameters until convergence criteria are met. The updated neural network parameters are then validated against a test subset before the new pattern is committed or inserted into the pattern recognition database 238 with appropriate feature vectors and classification metadata. The continuous learning capability enables the wireless communication device 104A and the system 100 to autonomously adapt to emerging signal types and interference patterns without requiring manual reconfiguration or offline training.

In accordance with an embodiment, the processor 230 may be further configured to generate feedback data based on the determined one or more signal patterns and processing performance metrics of the wireless communication device 104A. The processor 230 may generate feedback data by continuously or periodically monitoring key performance metrics such as signal detection accuracy, false alarm rates, and processing latency. The processor 230 may then correlate the key performance metrics with the determined signal patterns to identify operational parameters that yield improved performance for specific signal environments. The processor 230 may combine pattern-specific performance data with system-level metrics such as throughput measurements, packet error rates, and energy efficiency statistics to create feedback vector (i.e., the feedback data) that may determine the effectiveness of current operational parameters. In an example, when the processor 230 may identify an MLO transmission pattern across 5 GHz and 6 GHz bands, the processor 230 may measure detection confidence levels achieved with current parameter settings alongside resource utilization metrics, then may generate feedback data such as recommended sensitivity adjustments, processing priority assignments, and domain-specific threshold modifications to that specific pattern type. The processor 230 may further calculate statistical confidence intervals for each feedback recommendation based on historical performance data stored in a performance history database, ensuring that parameter adjustments are statistically significant rather than responses to transient conditions. The feedback generation may help the wireless communication device 104A to adapt to dynamic Wi-Fi 7® environments with varying signal densities, interference profiles, and traffic patterns, improving overall communication reliability and spectral efficiency.

In accordance with an embodiment, the processor 230 may be further configured to adjust the plurality of operational parameters based on the generated feedback data. The processor 230 may be configured to update a hierarchical parameter sequence that first modifies RF front-end parameters such as filter bandwidths and gain settings, followed by adjustments to signal processing parameters including FFT sizes and window functions, and finally updates to higher-level domain-specific feature extraction and pattern recognition parameters. In an example, when the feedback data indicates degraded performance in detecting frequency-hopping signals within the 6 GHz band, the processor 230 may adjust the operational parameter such as spectral domain sensitivity thresholds to improve frequency component detection, modifies temporal domain correlation windows to better capture hop timing characteristics, and may update pattern recognition confidence thresholds to reduce false classifications. The adjustment of the operational parameter may create a synergistic relationship between observed performance and operational configuration and may enable the wireless communication device 104A to maintain optimal performance in dynamic Wi-Fi 7® environments with varying signal conditions, interference sources, and traffic patterns.

In accordance with an embodiment, the processor 230 is further configured to determine whether a confidence score indicative of a probability of successful detection of the one or more signal patterns in the first pass is greater than a defined threshold. The processor 230 may be configured to calculate the confidence score that shows how certain the wireless communication device 104A is about detecting signal patterns correctly. The processor 230 may be configured to generate confidence scores from 0.0 to 1.0 where 1.0 represents maximum detection probability, 0.5 represents intermediate detection probability, and 0.0 represents minimum detection probability. The processor 230 may be configured to compare the confidence score against a preset threshold value that determines if detection was successful. The processor 230 may be configured to use different threshold values depending on conditions –0.95 threshold in quiet environments where accuracy is priority, 0.85 threshold for normal conditions, and 0.75 threshold in noisy environments with lots of interference. The processor 230 may be configured to decide that pattern detection succeeded when the confidence score is above the threshold and failed when the score is below the threshold. The processor 230 may be configured to take different actions based on the comparison. The processor 230 may be configured to accept the detected patterns and move to the next step when confidence exceeds the threshold. The processor 230 may be configured to run additional analysis when confidence falls below the threshold to try improving detection accuracy. The processor 230 may be configured to adjust system parameters when confidence scores consistently fail to meet requirements across multiple attempts. For example, when confidence scores consistently fall below the 0.85 threshold due to poor signal detection in the 6 GHz band, the processor 230 may be configured to adjust system parameters including increasing FFT size from 1024 to 2048 points for better frequency resolution, raising LNA gain from 20 dB to 25 dB for improved signal capture, modifying beamforming weights to focus reception toward detected signal directions, and lowering correlation thresholds from 0.95 to 0.8 to increase detection sensitivity for weak spread spectrum signals.

In accordance with an embodiment, the processor 230 is further configured to re-execute a multi-dimensional signal state processing operation and a multi-state correlation operation with one or more updated processing parameters when the confidence score is less than the defined threshold. For example, the processor 230 may be configured to initiate a second processing iteration by adjusting the one or more updated processing parameters including increasing FFT resolution from 1024 to 2048 points to improve spectral analysis accuracy, modifying correlation thresholds from 0.85 to 0.75 to increase pattern detection sensitivity, and adjusting feature extraction parameters to focus on more discriminative signal characteristics. The processor 230 may be configured to re-execute the multi-dimensional signal state processing operation by regenerating the plurality of signal state representations including the time domain state representation, frequency domain state representation, phase state representation, amplitude state representation, and wavelet state representation using the updated processing parameters to enhance signal characteristic extraction. The processor 230 may be configured to apply the updated parameters to domain-specific feature extraction operations including spectral domain analysis with higher resolution settings, temporal domain analysis with adjusted window functions, spatial domain analysis with modified beamforming weights, and polarization domain analysis with updated discrimination thresholds. The processor 230 may be configured to re-execute the multi-state correlation operation by recalculating intra-band correlations among the regenerated plurality of signal state representations within each intermediate frequency band and computing inter-band correlations between corresponding state representations across different intermediate frequency bands using the updated correlation sensitivity parameters. The processor 230 may be configured to construct an updated correlation matrix based on the recalculated correlation coefficients and may be configured to redetermine correlated signal patterns using the enhanced correlation analysis results. The processor 230 may be configured to calculate a new confidence score based on the updated processing results and may be configured to compare the new confidence score against the defined threshold to determine if additional processing iterations are required or if pattern detection has achieved sufficient reliability for operational response generation.

In accordance with alternative embodiment, the processor 230 may be further configured to detect a jamming signal and perform a jamming suppression of the detected jamming signal based on the determined one or more signal patterns. The processor 230 may analyze the determined signal patterns against legitimate signal characteristics to identify the jamming indicators such as statistically improbable power distributions, non-standard spectral occupancy patterns, or protocol timing violations. If a jamming signal is identified, the processor 230 may check historical feedback data to evaluate if similar signal patterns previously correlated with performance degradation across multiple intermediate frequency bands. The detection operation may employ periodic parameter adjustments to optimize jamming mechanisms, for example, incrementally modifying detection thresholds based on observed false positive/negative rates and adjusting the weighting of different signal domains (spectral, temporal, spatial, and polarization) in the analysis. The processor 230 may further monitor interference patterns targeting MLO operations, such as synchronized disruption across multiple intermediate frequency bands or selective jamming during link handover periods. The wireless communication device 104A may maintain a database (e.g. the pattern recognition database 238) that continuously evolves based on the determined interference patterns (also may referred to as jamming patterns), enabling identification of both persistent and intermittent jamming sources.

As an example, the wireless communication device 104A may detect jammer type in digitized down-converted signals across the two intermediate frequency bands (e.g., 5 GHz and 6 GHz) based on the cross-band correlation and determined signal characteristics of the digitized down-converted signals. In an example, the spatial domain analysis across the intermediate frequency bands may provide robust signal characterization, distinguishing between legitimate traffic and potential jamming signals. Advantageously, the determined signal characteristics enable real-time adaptation of mitigation operations. The continuous analysis of the signal characteristics in the one or more signal patterns across both frequency bands may also support the cognitive learning, such as the ANN model 232, allowing the wireless communication device 104A to improve its jammer identification and mitigation capabilities over time.

In accordance with an embodiment, the processor 230 may be further configured to perform the jamming suppression of the detected jamming signal based on the determined one or more signal patterns, the generated feedback data, and a periodic adjustment of the plurality of operational parameters. The processor 230 may apply spatial nulling through an adaptive beamforming process that may dynamically compute and update complex antenna weights for the MIMO antenna array 204. Based on the calculated null steering parameters, the processor 230 may generate a null pattern by adjusting the amplitude and phase of each antenna element to create destructive interference in the jammer's direction while maintaining constructive interference for signals-of-interest. The nulling implementation may include real-time computation of antenna weight vector using constrained optimization techniques that may minimize power reception from the jammer's spatial location while maximizing the signal-to-interference-plus-noise ratio (SINR) for desired signals. The processor 230 may continuously adjust the null pattern using a feedback loop that monitors residual interference levels and jammer movement through spatial tracking, enabling dynamic suppression that follows mobile jammers. In the adaptive beamforming, radiation pattern of the MIMO antenna array 204 may be adjusted in real-time to optimize signal reception. The processor 230 may execute adaptive beamforming using the 4×4 MIMO antenna array 204 through a two-fold process. Firstly, the processor 230 may be configured to dynamically enhance signal reception in desired directions by computing and applying optimal beamforming weights (amplitude and phase), for example, based on Minimum Variance Distortion Less Response. For example, if a signal-of-interest is detected at 30 degrees, the processor 230 may calculate complex weights for each antenna element to form a beam maximum in that direction. Concurrently, null steering may be executed by projecting such beamforming weights onto the null space of interference directions. For example, if interference is detected at 90 degrees, the processor 230 may modify the beamforming weights to create a spatial null in that direction while maintaining the desired beam pattern. The weights may be continuously updated based on changing signal conditions, where the processor 230 may utilize spatial covariance estimation and interference-plus-noise modeling to optimize the beam pattern, achieving both objectives of signal enhancement and interference suppression concurrently. For example, when an interference source moves (e.g., one of the moving interface sources 114) from 90° to 100°, the processor 230 may immediately recalculate weights to shift the null position while preserving desired signal reception, thereby enabling dynamic interference rejection, consistent signal enhancement, and real-time beam pattern optimization for robust spectrum monitoring. In other words, the processor 230 may be further configured to maintain null positions for the null steering through adaptive tracking of the moving interference sources 114.

In accordance with an embodiment, the processor 230 may be configured to perform signal classification based on the extracted domain-specific features The classified signals may comprise one or more of legitimate signal communications (e.g., from legitimate signal sources 108), potential jamming signals (e.g., from the signal jamming sources 110), frequency hopping transmissions (e.g., from the moving interference sources 114), or unknown or anomalous signals tagged for further analysis (e.g., from the unknown signal sources 112).

In an example, when the classified signals are identified as legitimate signal communications (e.g., from legitimate signal sources 108, the processor 230 may be further configured to select different frequency bands for signal monitoring while maintaining current communication links; may adjust filter parameters of the plurality of different filters 212 and correlation thresholds in the cross-correlation to maintain signal quality based on validated patterns. The processor 230 may optimize spectrum resource allocation to enhance network performance. For example, to optimize band selection, the processor 230 may switch between 2.4/5/6 GHz bands based on interference levels. In another example, in order to optimize band selection, the processor 230 may dynamically select 6 or 7 GHz for 320 MHz bandwidth when higher throughput needed from a current throughput state or may switch back to 5 GHz for 160 MHz bandwidth when appropriate (e.g., throughput need decreased) or fall back to 2.4 GHz band when needed for redundancy. Further, to optimize resolution, the processor 230 may select between 19 kHz, 39 kHz, or 75 kHz subcarrier spacing in an example. In another example, the same data item may be sent via the first intermediate frequency band the second intermediate frequency band to not only improve reliability through redundant processing paths but also provide periodically cross-validation of signal characteristics which in turn enhances detection accuracy through multiple observations and provides better immunity against band-specific interference. Further, other operational responses when the classified signals are legitimate signal communications (e.g., from legitimate signal sources 108) may include but are not limited to spectrum usage coordinate and legitimate signal information sharing with the wireless communication devices 104B, 104C, . . . , 104N in the wireless mesh network 106, update of the pattern database with confirmed legitimate signal signatures, continuous spectrum monitoring to track signal characteristic changes, operational parameters adaptation based on evolving signal conditions. These actions may collectively ensure reliable handling of legitimate communications while optimizing system awareness and performance.

In another scenario, when the classified signals are potential jamming signals, the processor 230 may be configured to perform the following operational response or actions: may execute null steering through adaptive beamforming to minimize jamming signal reception while maintaining tracking of the moving interference sources 114. The processor 230 may be configured to adjust filter configurations and LO parameters for enhanced jamming rejection. The processor 230 may be configured to update detection parameters and correlation thresholds based on identified jamming patterns. The processor 230 may be configured to generate alerts when energy patterns match defined jamming threat criteria. The processor 230 may be configured to monitor spectral density variations to assess jamming effectiveness. The processor 230 may be configured to adapt bandwidth allocation to maintain network performance in presence of jamming signals. These coordinated actions may enable effective jamming mitigation while maintaining network operation.

In yet another scenario, when the classified signals are identified as frequency hopping transmissions (e.g., from the moving interference sources 114), the processor 230 may dynamically adjust bandwidth and correlation parameters to maintain tracking as frequencies change. The processor 230 may be configured to perform cross-band correlation to validate detected frequency hops. The processor 230 may be configured to execute adaptive beamforming to maintain signal reception across frequency transitions. The processor 230 may be configured to update the pattern recognition database 238 with newly identified hopping sequences. The processor 230 may be configured to share hopping pattern information across the wireless mesh network 106 for coordinated monitoring. The processor 230 may be configured to generate alerts if hopping patterns match threat criteria and may adapt spectrum allocation to minimize interference with legitimate communications. These coordinated actions may enable effective tracking and response to frequency hopping signals.

In another scenario, when the classified signals are identified as unknown or anomalous signals tagged for further analysis (e.g., from the unknown signal sources 112), the processor 230 may be configured to generate the following operational response (or perform the following actions). The processor 230 may be configured to execute enhanced cross-band correlation across both intermediate frequency bands to gather additional signal characteristics. The processor 230 may be configured to perform high-resolution spectral analysis by adjusting subcarrier spacing and LO drifting parameters. The processor 230 may be configured to compare signal patterns against the pattern recognition database 238 using the trained ANN model 232 for potential matches. The processor 230 may be configured to collect and store detailed signal parameters including modulation, timing, and frequency characteristics for further analysis. The processor 230 may be configured to distribute anomalous signal information across the wireless mesh network 106 to gather correlated observations. The processor 230 may be configured to generate alerts for persistent unknown patterns. The processor 230 may be configured to adapt signal detection thresholds for the unknown or anomalous signals to improve sensitivity for similar future signals. The processor 230 may be configured to maintain continuous monitoring of the identified frequency bands where unknown signals were detected. These actions may enable comprehensive characterization and tracking of unknown signal sources.

In accordance with an embodiment, the processor 230 may be further configured to generate threat assessments based on the classified signals. The threat assessments may be based on real-time analysis of classified signals. The threat classification may be jamming detection, protocol violations, such as unauthorized or anomalous network behaviors, behavioral anomalies (e.g., using the ANN model 232 to recognize deviations from expected RF patterns), or signal origin tracking (e.g., locating sources of threats using multi-node triangulation and spatial processing). The processor 230 may be further configured to generate one or more alerts when the correlated energy patterns match a defined threat criteria as the operational response.

In accordance with an embodiment, the processor 230 may be further configured to update a database of historical signal correlation patterns (i.e., the pattern recognition database 238), the after each event of the cross-band correlation. The processor 230 may be further configured to execute a trained artificial neural network model, i.e., the ANN model 232, to identify recurring signal patterns at each event of the cross-band correlation. The processor 230 may be further configured to update correlation thresholds based on pattern recognition results from the identified recurring signal patterns at each event of the cross-band correlation. The processor 230 may be further configured to adjust detection parameters of signal correlation patterns in the cross-band correlation based on successful pattern matches to identify new or evolving signal patterns at one or more subsequent events of the cross-band correlation as the operational response. The adaptive learning mechanism improves accuracy in cross-band correlation, ensuring the wireless communication device 104A may effectively track signal behaviors and enhances real-time spectrum monitoring and threat detection.

In accordance with an embodiment, the training of the ANN model 232 for spectrum monitoring may follow a structured approach that may integrate deep learning techniques with real-time RF signal processing. In an exemplary implementation, the ANN model 232 may be used for identifying recurring signal patterns at each event of the cross-band correlation. The ANN model 232 may enable adaptive spectrum analysis by leveraging a combination of deep learning, specifically using convolutional neural networks (CNNs), long short-term memory networks (LSTMs), and Transformer-based architectures to recognize complex RF signatures. The training process may include data acquisition and preprocessing, where the system 100 may use some test wireless communication devices (e.g., like the wireless communication devices 104A, 104B, 104C, . . . , 104N) and capture RF signals using a 4×4 MIMO antenna array, such as the MIMO antenna array 204, which may supports dual-polarization and operates from DC to 100 GHz or DC to 300 GHz. The signal filtering and conversion may be applied before digitization, using band-specific filtering to isolate signals of interest. Further, FFT and wavelet transforms may be used for spectral analysis, ensuring frequency-domain features are extracted. Thereafter, feature extraction may occur. The system 100 may apply multi-dimensional analysis combining spectral, temporal, and spatial processing to enhance detection accuracy. Further, MLO-based cross-band correlation may be used to align data from predefined frequency bands like the 5 GHz and 6 GHz bands. Further, features, such as modulation type, frequency components, interference patterns, and spatial signatures may be extracted. Thereafter, the ANN model 232 may be trained using labeled historical datasets stored in the pattern recognition database 238. The CNN layers may be used to handle spatial features, while the LSTM layers may be used for sequential pattern detection over time. Further, to further enhance detection and classification of signals, transformer-based models may be deployed for contextual feature learning and adaptive anomaly detection. The federated learning techniques may be employed to enable distributed training across multiple nodes for real-time adaptation to obtain the trained ANN model 232.

In accordance with an embodiment, performance optimization to adjust network parameters may be carried out using Bayesian hyperparameter tuning. Further, pruning, quantization, and knowledge distillation may help reduce computational overhead. The trained ANN model 232 may undergo real-time updates via online learning algorithms to adapt to new interference patterns. Examples of the online learning algorithms used may include multi-armed bandit (MAB) Algorithms, deep q-networks (DQN) for Spectrum Adaptation, or Incremental Learning (online backpropagation). Each node in the wireless mesh network 106 may contribute to global model updates (e.g., at the central cloud server 102) without sharing raw data. For example, learned interference features may be shared across different locations to enhance pattern recognition.

Furthermore, at the time of execution, the trained ANN model 232 may process incoming RF data to detect signal anomalies, classify threats, and support dynamic spectrum reallocation. The system 100 may integrate edge computing for local signal classification and the central cloud server 102 (cloud ANN model) for large-scale anomaly detection. The trained ANN model 232 allows AI-enhanced spectrum monitoring, real-time threat detection, dynamic signal classification, cross-band interference mitigation, and autonomous spectrum adaptation. By leveraging the ANN model 232, wireless spectrum sensing, signal identification, and interference analysis may be significantly enhanced across a wide range of frequency bands (DC to 300 GHz).

FIG. 3A, FIG. 3B, FIG. 3C, and FIG. 3D are diagrams that illustrate a flowchart of a set of exemplary operations for enhanced detection and processing of spread spectrum signals, in accordance with an embodiment of the disclosure. FIG. 3A, FIG. 3B, FIG. 3C, and FIG. 3D are explained in conjunction with elements from FIG. 1 and FIG. 2. With reference to FIG. 3A, FIG. 3B, FIG. 3C, and FIG. 3D there is shown a flowchart 300 of a method that includes a set of exemplary operations 302 through 344. The flowchart 300 may be implemented in any of the wireless communication devices 104A, 104B, 104C, . . . , 104N.

Figure 3A:
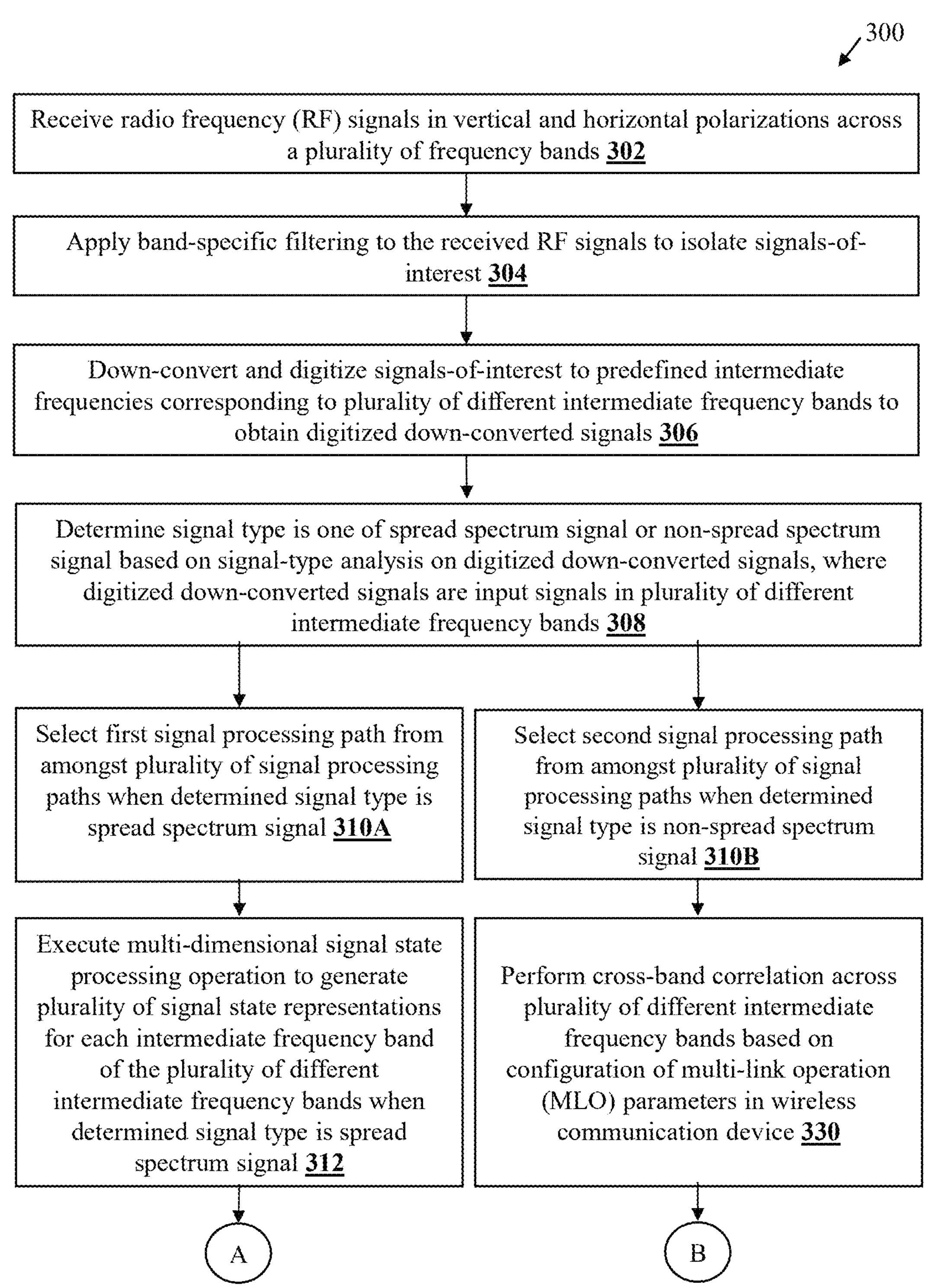
FIG. 3A, FIG. 3B, FIG. 3C, and FIG. 3D are diagrams that illustrate a flowchart of a set of exemplary operations for enhanced detection and processing of spread spectrum signals, in accordance with an embodiment of the disclosure.

With reference to FIG. 3A, at operation 302, radio frequency (RF) signals may be received in vertical and horizontal polarizations across a plurality of frequency bands.

At operation 304, band-specific filtering operation may be applied to the received RF signals to isolate signals-of-interest.

At operation 306, the isolated signals-of-interest may be down-converted and digitized to predefined intermediate frequencies corresponding to a plurality of different intermediate frequency bands to obtain digitized down-converted signals.

At operation 308, a signal type may be determined that is one of a spread spectrum signal or a non-spread spectrum signal based on a signal-type analysis on digitized down-converted signals. The digitized down-converted signals may be input signals in a plurality of different intermediate frequency bands. In a case where the signal type is the spread spectrum signal, the control passes to operation 310A, or else the control passes to operation 310B.

At operation 310A, a first signal processing path may be selected from amongst a plurality of signal processing paths when the determined signal type is the spread spectrum signal. The control passes to operation 312 from the operation 310A. At operation 310B, a second signal processing path may be selected from amongst the plurality of signal processing paths when the determined signal type is the non-spread spectrum signal. The control passes to operation 330 from the operation 310B.

At operation 312, a multi-dimensional signal state processing operation may be executed to generate a plurality of signal state representations for each intermediate frequency band of the plurality of different intermediate frequency bands when the determined signal type is the spread spectrum signal. The control passes to operation 314 of FIG. 3B.

Figure 3B:
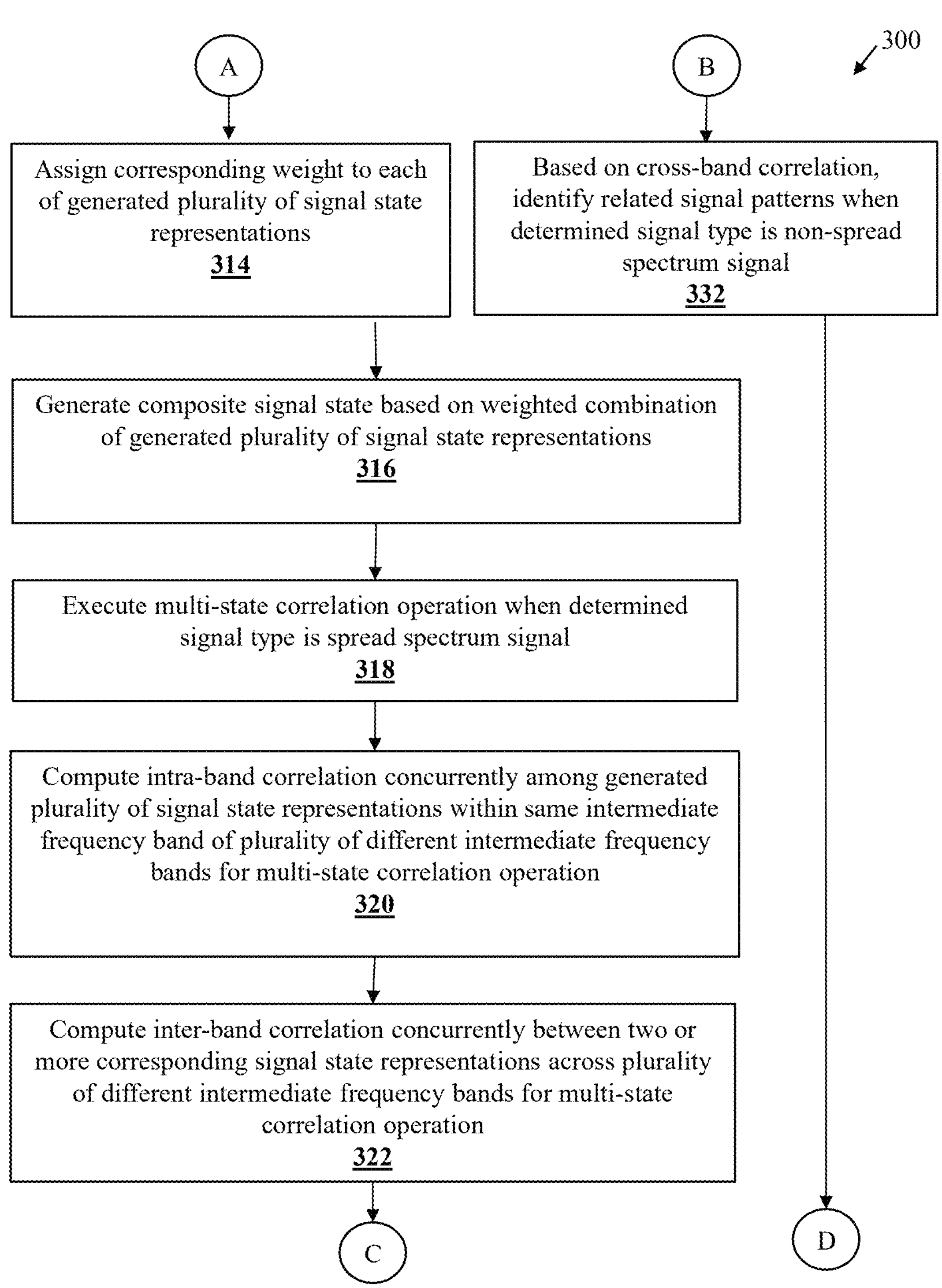

With reference to FIG. 3B, at operation 314, a corresponding weight may be assigned to each of the generated plurality of signal state representations.

At operation 316, a composite signal state may be generated based on a weighted combination of the generated plurality of signal state representations.

At operation 318, a multi-state correlation operation may be executed when the determined signal type is the spread spectrum signal.

At operation 320, an intra-band correlation may be computed concurrently among the generated plurality of signal state representations within same intermediate frequency band of the plurality of different intermediate frequency bands for the multi-state correlation operation.

At operation 322, an inter-band correlation may be computed concurrently between two or more corresponding signal state representations across the plurality of different intermediate frequency bands for the multi-state correlation operation. The control passes to operation 324 of FIG. 3C.

Figure 3C:
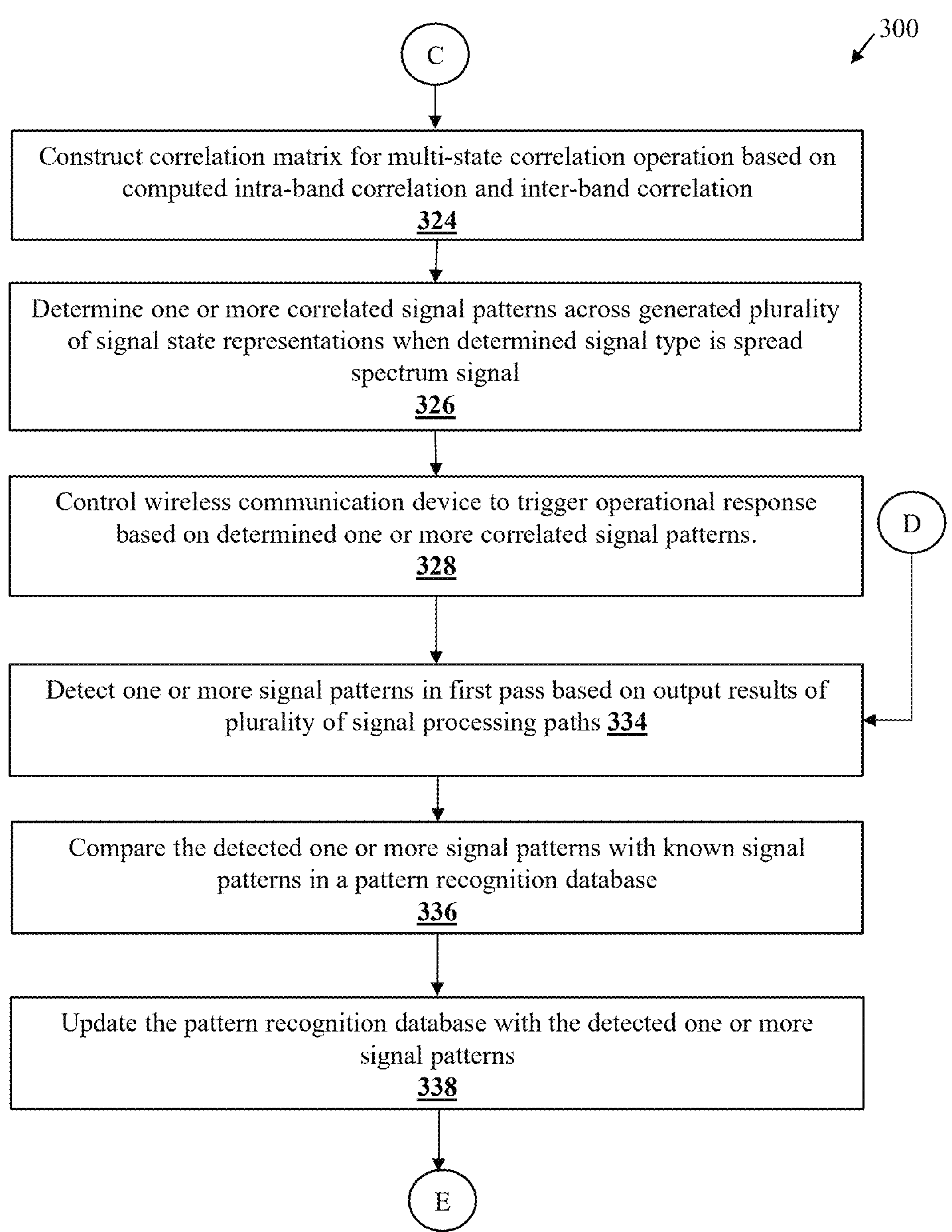

With reference to FIG. 3C, at operation 324, a correlation matrix may be formed for the multi-state correlation operation based on the computed intra-band correlation and the inter-band correlation.

At operation 326, one or more correlated signal patterns may be determined across the generated plurality of signal state representations when the determined signal type is the spread spectrum signal.

At operation 328, the wireless communication device may be controlled to trigger an operational response based on the determined one or more correlated signal patterns.

At operation 330, a cross-band correlation may be performed across the plurality of different intermediate frequency bands based on configuration of multi-link operation (MLO) parameters in the wireless communication device. The cross-band correlation may be independent of the generation of the plurality of signal state representations in the multi-dimensional signal state processing operation. The control passes to operation 332 of FIG. 3B.

Now referring back to FIG. 3B, at operation 332, based on the cross-band correlation, related signal patterns may be identified when the determined signal type is the non-spread spectrum signal. The control passes to operation 334 of FIG. 3C.

Now referring to FIG. 3C, at operation 334, one or more signal patterns may be detected in a first pass based on output results of the plurality of signal processing paths.

At operation 336, the detected one or more signal patterns may be compared with known signal patterns in the pattern recognition database 238.

At operation 338, the pattern recognition database 238 may be updated with the detected one or more signal patterns. The control passes to operation 340 of FIG. 3D.

Figure 3D:
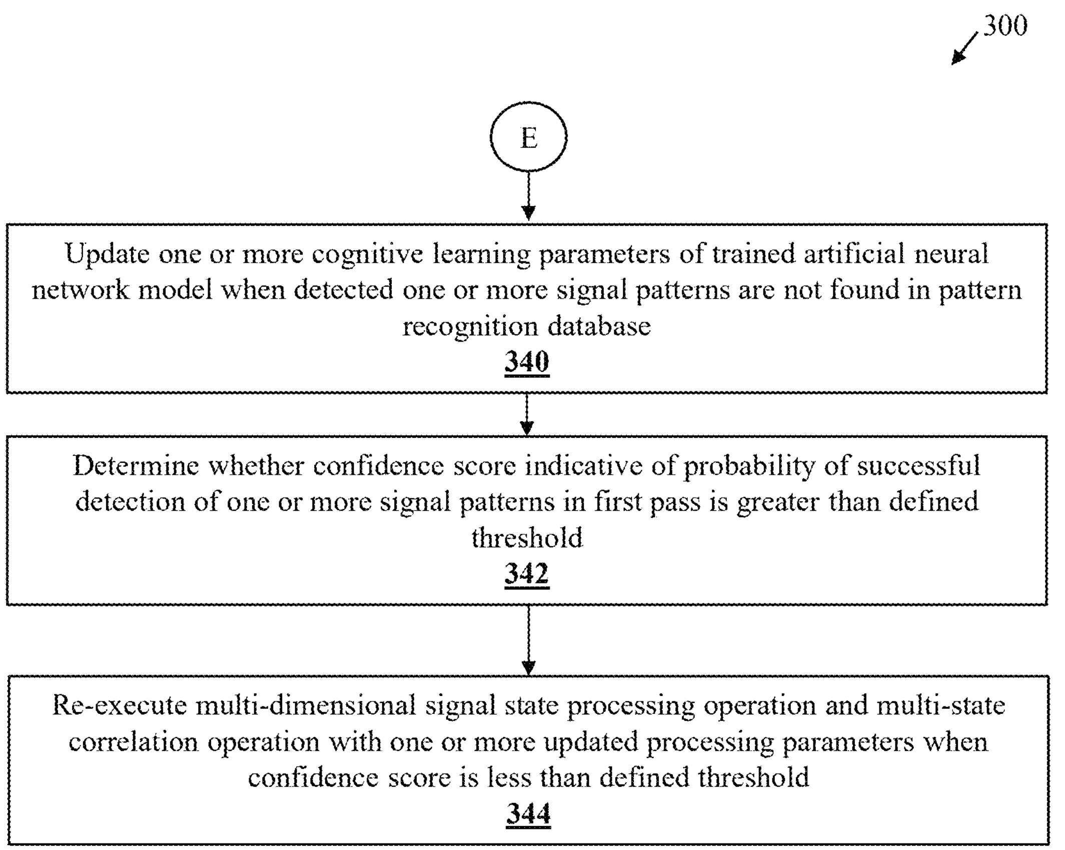

With reference to FIG. 3D, at operation 340, one or more cognitive learning parameters of the trained ANN model 232 may be updated when the detected one or more signal patterns are not found in the pattern recognition database 238.

At operation 342, it is determined whether a confidence score indicative of a probability of successful detection of the one or more signal patterns in the first pass is greater than a defined threshold.

At operation 344, the multi-dimensional signal state processing operation and the multi-state correlation operation is re-executed with one or more updated processing parameters when the confidence score is less than the defined threshold.

Various embodiments of the disclosure may provide the wireless communication device 104A. The wireless communication device 104A may include the processor 230 configured to determine a signal type is one of a spread spectrum signal or a non-spread spectrum signal based on a signal-type analysis on digitized down-converted signals, where the digitized down-converted signals are input signals in a plurality of different intermediate frequency bands. The processor 230 is further configured to execute a multi-dimensional signal state processing operation to generate a plurality of signal state representations for each intermediate frequency band of the plurality of different intermediate frequency bands when the determined signal type is the spread spectrum signal. The processor 230 is further configured to determine one or more correlated signal patterns across the generated plurality of signal state representations when the determined signal type is the spread spectrum signal. The processor 230 is further configured to control the wireless communication device 104A to trigger an operational response based on the determined one or more correlated signal patterns.

Various embodiments of the disclosure may provide a computer program product for adaptive RF spectrum analysis, the computer program product comprising a non-transitory computer-readable storage medium having program instructions embodied therewith, the program instructions are executable by a system to cause the system to execute operations, the operations comprising determining a signal type is one of a spread spectrum signal or a non-spread spectrum signal based on a signal-type analysis on digitized down-converted signals, where the digitized down-converted signals are input signals in a plurality of different intermediate frequency bands. The operations further include executing a multi-dimensional signal state processing operation to generate a plurality of signal state representations for each intermediate frequency band of the plurality of different intermediate frequency bands when the determined signal type is the spread spectrum signal. The operations further include determining one or more correlated signal patterns across the generated plurality of signal state representations when the determined signal type is the spread spectrum signal. The operations further include controlling the wireless communication device 104A to trigger an operational response based on the determined one or more correlated signal patterns.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed of as computer data embodied in a computer-readable storage medium such as non-transitory computer-readable transmission medium (e.g., solid state memory or any non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowchart, depending upon the technology involved, the operations can be performed in a different order than what is shown in the flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or freely propagating electromagnetic waves, electromagnetic waves propagating through a waveguide, light pulses passing through a fiber optic cable, electrical signals communicated through a wire, and/or various transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A wireless communication device, comprising:

a processor configured to:

determine a signal type is one of a spread spectrum signal or a non-spread spectrum signal based on a signal-type analysis on digitized down-converted signals, wherein the digitized down-converted signals are input signals in a plurality of different intermediate frequency bands;

execute a multi-dimensional signal state processing operation to generate a plurality of signal state representations for each intermediate frequency band of the plurality of different intermediate frequency bands when the determined signal type is the spread spectrum signal;

determine one or more correlated signal patterns across the generated plurality of signal state representations when the determined signal type is the spread spectrum signal; and control the wireless communication device to trigger an operational response based on the determined one or more correlated signal patterns.

2. The wireless communication device of claim 1, wherein the plurality of signal state representations comprises two or more of: a time domain state representation, a frequency domain state representation, a phase state representation, an amplitude state representation, or a wavelet state representation.

3. The wireless communication device of claim 2, wherein the processor is further configured to:

assign a corresponding weight to each of the generated plurality of signal state representations; and generate a composite signal state based on a weighted combination of the generated plurality of signal state representations.

4. The wireless communication device of claim 1, wherein the processor is further configured to execute a multi-state correlation operation when the determined signal type is the spread spectrum signal.

5. The wireless communication device of claim 4, wherein the processor is further configured to compute an intra-band correlation concurrently among the generated plurality of signal state representations within same intermediate frequency band of the plurality of different intermediate frequency bands for the multi-state correlation operation.

6. The wireless communication device of claim 5, wherein the processor is further configured to compute an inter-band correlation concurrently between two or more corresponding signal state representations across the plurality of different intermediate frequency bands for the multi-state correlation operation.

7. The wireless communication device of claim 6, wherein the processor is further configured to construct a correlation matrix for the multi-state correlation operation based on the computed intra-band correlation and the inter-band correlation.

8. The wireless communication device according to claim 1, further comprising one or more antenna arrays that comprises a plurality of dual-polarized antennas configured to receive radio frequency (RF) signals in vertical and horizontal polarizations across a plurality of frequency bands.

9. The wireless communication device according to claim 8, further comprising a radio frequency (RF) front-end coupled to the one or more antenna arrays and configured to:

apply band-specific filtering to the received RF signals to isolate signals-of-interest; and down-convert and digitize the signals-of-interest to pre-defined intermediate frequencies corresponding to the plurality of different intermediate frequency bands to obtain the digitized down-converted signals.

10. The wireless communication device according to claim 8, wherein the plurality of frequency bands captured by the one or more antenna arrays ranges from direct current (DC) to 300 gigahertz (GHz).

11. The wireless communication device according to claim 1, wherein the plurality of different intermediate frequency bands corresponds to two or more of: 2.4 gigahertz (GHz), 5 GHZ, 6 GHZ, 7 GHZ, or an unlicensed or Industrial, scientific, and medical (ISM) frequency band.

12. The wireless communication device of claim 1, wherein the processor is further configured to:

perform a cross-band correlation across the plurality of different intermediate frequency bands based on configuration of multi-link operation (MLO) parameters in the wireless communication device; and based on the cross-band correlation, identify related signal patterns when the determined signal type is the non-spread spectrum signal, wherein the cross-band correlation is independent of the generation of the plurality of signal state representations in the multi-dimensional signal state processing operation.

13. The wireless communication device of claim 1, wherein the processor is further configured to:

select a first signal processing path from amongst a plurality of signal processing paths when the determined signal type is the spread spectrum signal; and select a second signal processing path from amongst the plurality of signal processing paths when the determined signal type is the non-spread spectrum signal.

14. The wireless communication device of claim 13, wherein the processor is further configured to detect one or more signal patterns in a first pass based on output results of the plurality of signal processing paths.

15. The wireless communication device of claim 14, wherein the processor is further configured to compare the detected one or more signal patterns with known signal patterns in a pattern recognition database.

16. The wireless communication device of claim 15, wherein the processor is further configured to update:

the pattern recognition database with the detected one or more signal patterns, and one or more cognitive learning parameters of a trained artificial neural network model when the detected one or more signal patterns are not found in the pattern recognition database.

17. The wireless communication device of claim 16, wherein the processor is further configured to determine whether a confidence score indicative of a probability of successful detection of the one or more signal patterns in the first pass is greater than a defined threshold.

18. The wireless communication device of claim 17, wherein the processor is further configured to re-execute a multi-dimensional signal state processing operation and a multi-state correlation operation with one or more updated processing parameters when the confidence score is less than the defined threshold.

19. A method for detection and processing of spread spectrum signals, the method comprising:

in a wireless communication device:

determining a signal type is one of a spread spectrum signal or a non-spread spectrum signal based on a signal-type analysis on digitized down-converted signals, wherein the digitized down-converted signals are input signals in a plurality of different intermediate frequency bands;

executing a multi-dimensional signal state processing operation to generate a plurality of signal state representations for each intermediate frequency band of the plurality of different intermediate frequency bands when the determined signal type is the spread spectrum signal;

determining one or more correlated signal patterns across the generated plurality of signal state representations when the determined signal type is the spread spectrum signal; and controlling the wireless communication device to trigger an operational response based on the determined one or more correlated signal patterns.

20. A computer program product for detection and processing of spread spectrum signals, the computer program product comprising a non-transitory computer-readable storage medium having program instructions embodied therewith, the program instructions are executable by a system to cause the system to execute operations, the operations comprising:

determining a signal type is one of a spread spectrum signal or a non-spread spectrum signal based on a signal-type analysis on digitized down-converted signals, wherein the digitized down-converted signals are input signals in a plurality of different intermediate frequency bands;

executing a multi-dimensional signal state processing operation to generate a plurality of signal state representations for each intermediate frequency band of the plurality of different intermediate frequency bands when the determined signal type is the spread spectrum signal;

determining one or more correlated signal patterns across the generated plurality of signal state representations when the determined signal type is the spread spectrum signal; and controlling a wireless communication device to trigger an operational response based on the determined one or more correlated signal patterns.

* * * * *